United States Patent [19]

Lefler et al.

[11] Patent Number: 4,724,285

[45] Date of Patent: Feb. 9, 1988

[54] STENOGRAPHIC TRANSLATION SYSTEM

[75] Inventors: Jerald P. Lefler, Simi Valley, Calif.; Scott Woodard, Chicago, Ill.

[73] Assignee: Digitext, Inc., Thousand Oaks, Calif.

[21] Appl. No.: 942,068

[22] Filed: Dec. 17, 1986

Related U.S. Application Data

[63] Continuation of Ser. No. 795,944, Nov. 7, 1985, abandoned.

[51] Int. Cl.$^4$ .............................................. H04L 3/00
[52] U.S. Cl. .................................. 178/21; 178/2 R; 178/26 R
[58] Field of Search ............. 178/21, 2 R, 26 R, 26 A; 400/91

[56] References Cited

U.S. PATENT DOCUMENTS 4,107,457  8/1978  Hajduk ............................... 128/2 R

OTHER PUBLICATIONS

A Structure for Real-time Stenotype Transcription, J. W. Newitt and A. Odarchenko, IBM System 360, No. 1, 1970, pp. 24–35.

Primary Examiner—Stafford D. Schreyer
Attorney, Agent, or Firm—Nilsson, Robbins, Dalgarn, Berliner, Carson & Wurst

[57] ABSTRACT

A steno translator system for translating stenographic keystrokes to language format according to a predefined keystroking methodology includes a steno writer to generate a sequence of stroke symbols each having associated therewith language parts consisting of suffixes, prefixes, word parts, punctuation and language symbols. A processor is coupled for receiving the stroke symbols and includes memory for storing a list of stroke entries, each represented by at least one stroke symbol, and an associated language part defining the translation for that stroke entry. The stroke entries are arranged in the memory in accordance with the predefined stroke entry order. The processor also includes a translator for segmenting the sequence of stroke symbols into a plurality of consecutive subsequences where each of the subsequences includes at least one stroke symbol and has a corresponding matching stroke entry in the memory. The translator matches selected stroke symbols generated by the steno writer in a particular known position in a subsequence against correspondingly positioned stroke symbols of the stroke entries in the memory. A subsequence is formed so that it includes the maximum number of stroke symbols for which there is a matching stroke entry in the processor memory. The language part corresponding to the stroke entry matching the subsequence is thereupon defined as the language part translation for that subsequence.

39 Claims, 11 Drawing Figures

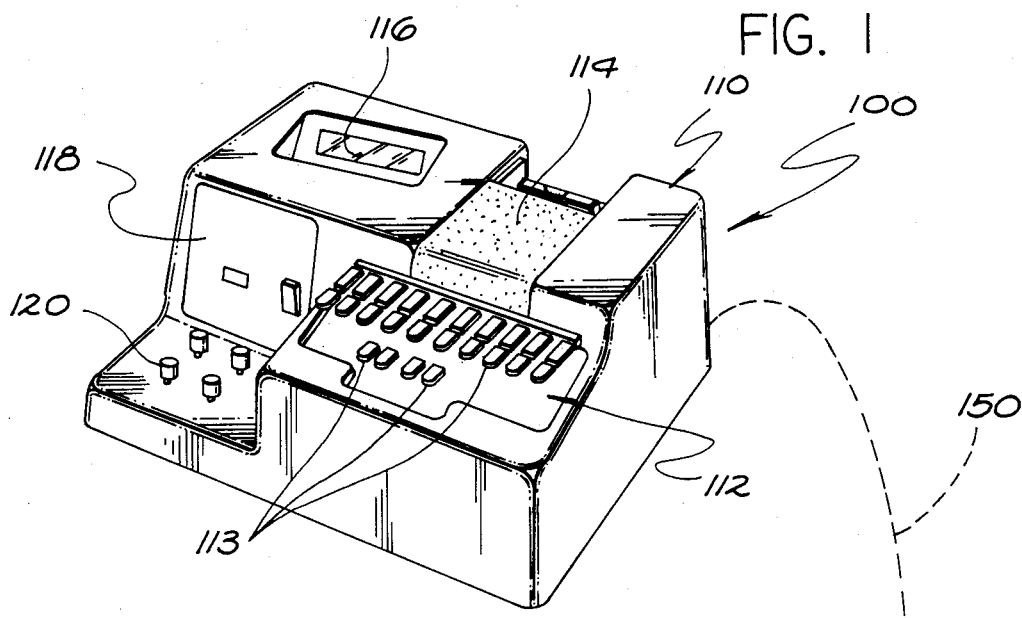
FIG. 1
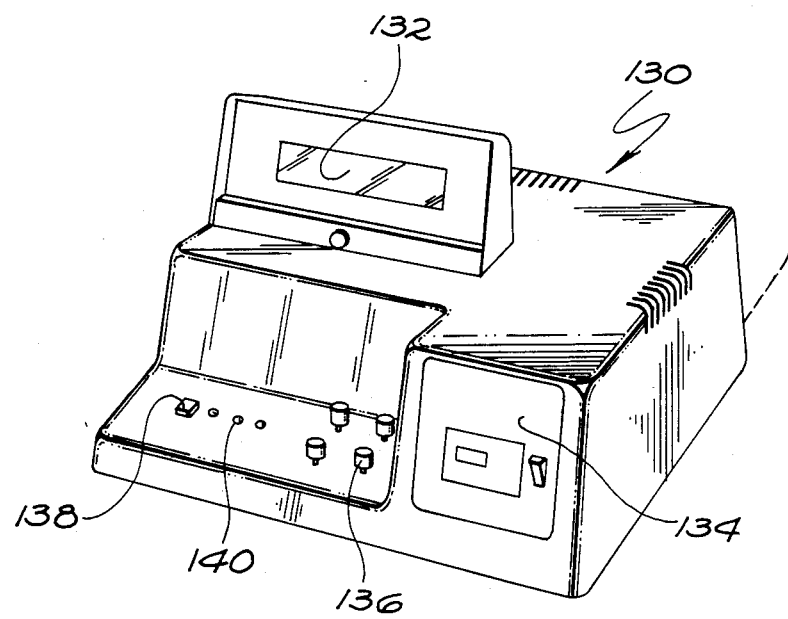

STKPWHRAO * EUFRPBLGTSDZ

FIG. 6A

760 → /*RBGS/PR-EUPL/T-EUF/PR-EUPL/T-EUPL/PR-EUPL/A-/TKO-PB/A-/PR-EUPBS/
     762   784  766 768  770  786 772 788 774 776 778 780 782
                                    764                    790

FIG. 6B

706 ⎯⎯ /PR-EUPL/A-/TKO-PB/A- = PRIMADONNA
           710   712
       /PR-EU/O-RI-ES = PRIORESS
         708

|  |  |  |
|---|---|---|
| | 726 | 728 |
| 734 { pring * | /PR-EUPBG | |
| { print * | /PR-EUPBT | |
| 732 { prince * | /PR-EUPBS}744 | |
| principal | /PR-EUPBS/PA-L}746 | |
| principle | /PR-EUPBS/P-EL}748 | |
| princess | /PR-EUPBS/-ES}750 | |
| { prin * | /PR-EUPB | |
| 736 { prim * | /PR-EUPL  802   803 | |
| primitively | /PR-EUPL/(T-EUFL)}804  805 | |
| primitive | /PR-EUPL/T-EUF}806 | |
| perimeter | /PR-EUPL/T-ER}808 | |
| primadonna | /PR-EUPL/A-/TKO-PB/A- | |
| { prix * | /PR-EUBGS | |
| { prick * | /PR-EUBG | |
| { pril * | /PR-EUL | |
| 738 { prig * | /PR-EUG | |
| priggish | /PR-EUG/-EURB | |
| 730 { prit * | /PR-EUT | |
| { >/pris | /PR-EUS | |
| 740 { pris | /PR-EUZ | |
| prisoner | /PR-EUZ/TPH-ER | |
| prismat | /PR-EUZ/PHA-T | |
| prismoid | /PR-EUZ/PHO-EUD | |
| 730 prism | /PR-EUZ/*-PL | |
| 742 { >/pri * | /PR-EU | |
| private | /PR-EU/SRA-T | |
| prioress | /PR-EU/O-R/-ES | |

STENOGRAPHIC TRANSLATION SYSTEM

This is a continuation of application Ser. No. 795,944, filed 11-7-85, abandoned.

BACKGROUND

The present invention relates to stenographic translation systems and methods and in particular to systems and methods capable of unambiguously translating a sequence of stroke symbols to language text consisting of words, phrases, sentences and graphic characters using a minimum amount of computer memory and maximum stroking flexibility.

The process of inputting data either from oral format or written format to computer readable format is generally considered the most time consuming and costly aspect of creating data bases. Conventionally, an operator will type data into a computer utilizing a typewriter. Even at maximum typing speeds of about 100 words per minute, data inputting by this technique has been found to be relatively slow. Each character must be individually inputted in a serial fashion by successively striking the keys representative of those characters. Hence, there is an opportunity for an error each time that a key is depressed and a character input. Furthermore, the speed at which words, phrases and sentences can be inputted to a data base via a conventional typewriter keyboard can be considerably less than the speed at which the words and phrases can be spoken rendering conventional keyboard inputting of data into a computer unworkable.

In order to overcome this speed problem in the Courtroom setting, stenographic machines and methods were developed whereby entire words or phrases could be recorded by a single depression of one or more keys of a stenographic machine. However, the resultant character sequence was not recognizable and required subsequent translation to readable text. Hence, upon completion, the person making the stenographic record would have to translate that record to English or other readable language. This process has been conventionally done by the operator reading the stenographic record and verbalizing a translation of that record in English with the English translation being recorded on tape. The tape has then been given to a person who would listen to the tape and type out the English words on a conventional typewriter keyboard. Obviously, this technique permitted rapid recording of words as they were spoken but required the same typewriter keyboard inputting step as before.

To overcome this translation difficulty, various automatic translation systems have been developed. In general, such systems have required a large dictionary of words consisting of one or more keystroke subsequences and corresponding English translations of those subsequences. When one or more keystrokes were entered by the stenographic keyboard operator, the computer searched the memory until a match could be found. Such systems generally required that all stenographic strokes and their corresponding translation be stored. Each keystroke required a search through all entries in the memory until a match was found. Such systems also lacked flexibility since each stroke variation and its associated translation had to be stored in memory to enable a translation to be made. Even then, such systems suffered from problems of translation ambiguities and the inability to translate certain subsequences of strokes because that subsequence had not been stored in the memory. Also, conventional stenographic translation systems have not accounted for homonyms. Hence, a single keystroke may be used to represent one of several homonyms requiring a person to observe the context and to manually select the correct homonym during editing. Further such systems generally haven't differentiated between suffixes and prefixes which greatly increased the time necessary to translate the stenographic input.

Because of the above problems, computerized translation systems have been ill suited for real time translation. Furthermore, such translation systems require significant editing time to clean up inherent stroking and translation ambiguities and untranslatable stroke subsequences.

By contrast, the present invention provides a real time translation system which utilizes a predefined stenographic stroking methodology, whereby complete and unambiguous translation of English, and any other language capable of expression by stenographic means, from stenographic keystroke format to English or other language format, can be accomplished thereby greatly reducing errors and editing by the operator while increasing stroking flexibility. Furthermore, the present invention significantly reduces the number of storage locations required to store keystrokes and corresponding language translations since individual stroke/word combinations need not be individually stored in the vast majority of cases. This enables the translation system to be completely portable and capable of being entirely contained in a single unit with the keyboard itself. Because translation is done in real time, the steno keyboard can, for the first time, replace the conventional computer typewriter keyboard of existing hardware and can be used to control peripherals such as word processors and the like. This allows the present system to readily interface with virtually any existing computer hardware. The present system also includes an arrangement of the stored dictionary which facilitate searching thereby enabling the present system to generate an accurate real time translation of spoken words. Such a system is particularly suitable for inputting data directly into a computer at speeds ranging up to five times faster than the conventional typewriter keyboard imputting method.

SUMMARY OF THE INVENTION

A steno translator system in accordance with the invention translates lexical stroke symbols in to language format in accordance with a predefined stenographic methodology. Each lexical stroke symbol is defined by at least one character from a character set comprising consonants and vowels where the vowels may be further categorized as short vowels, long vowels and y-ending vowels. Various flag symbols can optionally be defined as other characters. For example, an asterisk can be predefined in a symbol which, when in conjunction with other characteristics of the stroke symbol, will indicate whether a stroke symbol is a suffix, prefix or word root. Other symbols can be studied to indicate whether a last letter is to be doubled in the translation or other alterations are to be made to the translation.

The system includes a stroke symbol means which may be a keyboard or tape recorder device for providing a sequence of lexical stroke symbols where each lexical stroke symbol is defined by at least a left consonant part, which includes at least one consonant character; a vowel part, which includes at least one vowel character; and a right consonant part which includes at least one consonant character. Lexical stroke symbols need not include all three parts but may include one or more of these parts. A processor means is linked for receiving the lexical stroke symbols from the stroke symbols means. The processor includes a scan chart memory which stores a selected list of chart entries. The list of chart entires includes a left consonant sublist, a vowel sublist and a vowel/right consonant sublist. Each chart entry has a language part stored in association therewith to define the translation of the chart entry.

The processor means further includes a translator means comprising a comparing means for comparing the left consonant part of selected lexical stroke symbols (which have a left consonant part) against the left consonant sublist. A match defines a left consonant translation. The comparing means also compares the vowel part of selected lexical stroke symbols (which have a vowel part but no right consonant part) against the vowel sublist. A match is defined as a vowel translation. Finally, the comparing means compares the combined vowel part and right consonant part of selected lexical stroke symbols, which include a right consonant part, against the vowel/right consonant sublist. A match defines a vowel/right consonant translation. Means are then provided for combining the left consonant, vowel and vowel/right consonant translation to define a stroke symbol translation. A stroke symbol translation is thus derived from the scan chart memory. Finally, means are provided for combining the stroke symbol translations of the lexical stroke symbols according to a predefined identifier rule set to define complete words in the language format.

The chart entries are selected as those whose translations constitute a literal translation according to a predefined reference chart. Hence, the grouping of lexical stroke symbols into left consonant, vowel and right consonant parts defines grouping criteria which are consistent with the grouping criteria of the sublist in the scan chart memory.

The steno translator system may further include an exception dictionary memory for those stroke symbols or subsequences of stroke symbols which are not otherwise acceptably translatable by reference to the scan chart memory. Each exception dictionary entry includes a subsequence which includes at least one lexical stroke symbol with an associated language part defining the translation of the subsequence. Searching means are then provided for searching first through the exception dictionary and if no match is found then through the scan chart dictionary to obtain a translation.

The processor then includes means for defining each stroke symbol translation derived from the scan chart memory as either a suffix, a prefix or a word part in accordance with the identifier rule set.

The stroke symbol means may include means for generating a series of stroke symbols where the series comprises a sequence of lexical stroke symbols and one or more control stroke symbols. The control stroke symbols are different from the lexical stroke symbols and are adapted to control the operation of the steno translator system and any auxiliary device attached thereto.

Finally, a mechanism is provided for modifying the exception dictionary by inputting translations and associated stroke symbols through the stenographic keyboard.

BRIEF DESCRIPTION OF THE DRAWINGS

A complete understanding of the present invention and of the above and other advantages thereof may be gained from a consideration of the following description of the preferred embodiments taken in conjunction with the accompanying drawings in which:

FIG. 1 is a pictorial representation of a translator and a steno writer interconnected in accordance with the invention.

FIG. 6A illustrates a predefined stenographic alphabet which may be used in the ordering of steno entries in the exception dictionary memory of the processor.

FIG. 6B illustrates a typical sequence of stroke symbols as they would be received by the translator for translation.

FIG. 6C illustrates the lexical stroke symbol subsequences for the words "primadonna" and "prioress".

FIG. 6D is a portion of the stroke entry-translation list for a plurality of words ordered in a sequence in accordance with the teaching of the present invention.

DETAILED DESCRIPTION

Figure 2:
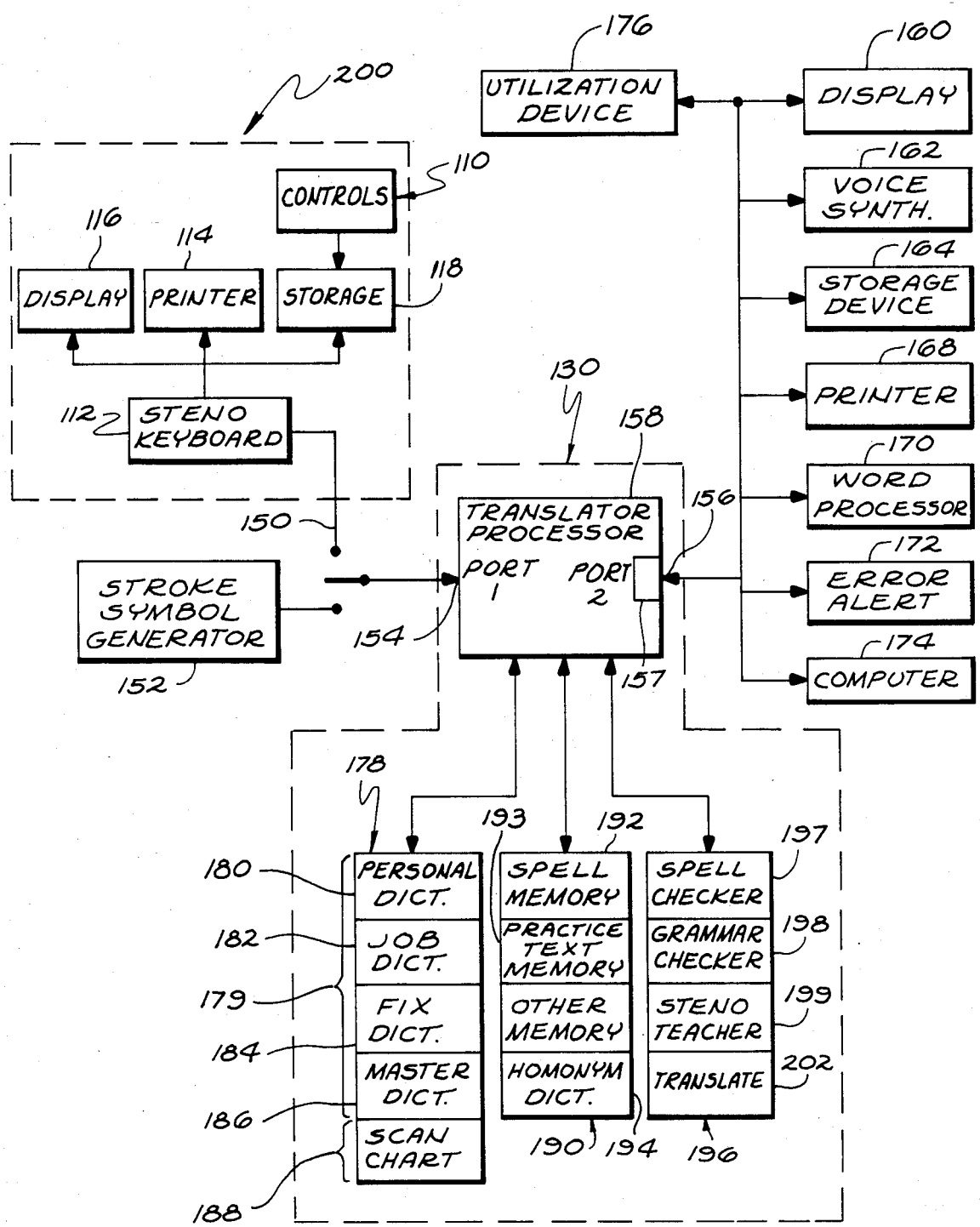
FIG. 2 is a block diagram of a stenographic translation system in accordance with the invention.

Referring to FIG. 1, a simplified stenographic translator system 100 includes a stroke symbol generator 110 and a translator 130 interconnected together by a suitable communications link 150. The stroke symbol generator 110 includes a steno keyboard 112 which may be of a conventional arrangement; a steno printer 114 interconnected to the steno keyboard to provide a written record of keystrokes generated by the steno keyboard 112; a steno display 116 such as a liquid crystal display, for displaying the keystrokes as they are generated by the steno keyboard 112; and a steno recorder 118 whereby a magnetic tape recording of a sequence of stroke symbols generated at the steno keyboard 112 can optionally be stored for later translation. The steno recorder 118 operates under the control of typical recorder switches 120.

In operation, an operator generates a series of stroke symbols, such as those illustrated in FIG. 6B, by successively depressing one or more keys 113 on the steno keyboard 112. Each simultaneous depression of one or more keys 113 of the steno keyboard 112 generates a stroke symbol. Each stroke symbol consists of one or more characters in a predefined character sequence comprising a predefined stenographic character alphabet (see FIG. 6A). The keys 113 are interconnected to the steno printer 114, the steno display 116 and the steno recorder 118 so that when a stroke symbol is generated by simultaneous depression of one or more keys of the steno keyboard 112, a written record of the stroke symbol is made on the steno printer 114, the most recently generated stroke symbol is displayed on the steno display 116, and each stroke symbol is stored in sequence on magnetic tape in the steno recorder 118.

The stroke symbol generator 110 may be a separate device without any electical communications link 150 to a translator 130 or other device. In such a configuration, the tape on which a sequence of stroke symbols has been stored by the steno recorder 118 can be removed and taken to a translator, such as the translator 130, for translation into words, phrases and sentences in accordance with the invention to be described hereafter. Alternatively, a direct communications link such as the communications link 150 may be interconnected between the stroke symbol generator or steno writer 110 and the steno translator 130 so that the stroke symbols generated at the steno keyboard 112 are converted to digital signals (such as in ASCII representation) and communicated in serial form directly to the translator 130 for immediate real time translation.

The translator 130 includes a translator display 132 on which the translation of the sequence of stroke symbols is displayed and a translator recorder/player 134 which may be used either to store a translated sequence of stroke symbols or to provide a source of stroke symbols to be translated. The translator recorder 134 is controlled by a plurality of translator recorder control buttons 136. The translator 130 further includes a reset switch 138, whose function will be described hereafter, and various indicator lights 140 to inform the operator of modes or conditions which may exist with respect to the operation of the translator 130.

Referring to FIG. 2, a block diagram of a steno translator system 200 such as that illustrated in FIG. 1 includes the steno writer (stroke symbol generator) 110 described in conjunction with FIG. 1 and the translator 130 for receiving a sequence of stroke symbols and either translating or initiating other system operations.

The steno writer 110 and the translator 130 are interconnected by the communications link 150. However, it will be appreciated that the steno writer 110 need not be the only stroke symbol generator which could be interconnected to the translator 130. For example, any device 152 such as a recording device, a computer or any other means by which a sequence of stroke symbols can be generated can be coupled to the translator 130.

The translator 130 includes a translator processor 158 having a first port 154 for being interconnected to the steno writer 110 or other stroke symbol generating means 152 and a second port 156 whereby the translator can be placed in communication with various devices such as an auxilliary display 160, a voice synthesizer 162, an external storage device such as a recorder 164, a printer 168, a word processor 170, an error alert device 172 such as a light or buzzer, a computer 174 or any other desired utilization device 176.

The translator 130 further includes a memory 178 which includes an exception memory 179 which consists of a list of stored lexical stroke entries and their associated language part consisting of translations of the lexical stroke entries. Each lexical stroke entry in the exception memory 179 consists of one or more stroke symbols stored in sequence. The language part stored in association with each such stroke entry includes suffixes, prefixes, word parts, punctuation or language symbols, each of which may be identified as such by an associated flag. The memory also includes a scan chart which is a list of lexical stroke symbol parts and their associated translations to be described in greater detail hereafter. The flags stored in conjunction with the stroke entry in the exception memory may be any predefined symbol such as a bracket, a slash symbol or letter identifying a language part as having a particular characteristic which requires translation in a particular way in the translator processor.

The exception memory 179 may be a single memory or may be divided into one or more memories where the processor 158 first selects the memory and then searches that memory. For example, in FIG. 2, the exception memory 179 includes a personal dictionary memory 180, a job dictionary memory 182, a fix dictionary memory 184, and a master dictionary memory 186. In the illustrated embodiment, the master dictionary 186 consists of a predefined list of permanently stored stroke entries and their associated language parts listed in order in a manner to be described hereafter. The master dictionary memory is permanent and hence cannot be altered by the operator. The master dictionary memory will only be accessed in the event that a match for an incoming subsequence of stroke symbols from either the steno writer 110 or other stroke symbol generator 152 cannot be found in the personal, job or fix dictionaries.

The job dictionary memory is arranged according to the same ordering methodology as the master dictionary. The job dictionary may be created on a word processor, such as the word processor 170, where it is edited and stored and then communicated via the second port 156 to the processor 158 under operator control via the input of appropriate control stroke symbols from the steno keyboard 112. Hence, it will be appreciated that the steno keyboard 112 can generate lexical stroke symbols for translation by the translator or control stroke symbols to control the translator system including accessory devices.

According to the translation system illustrated, identical stroke entries may be stored in different dictionary memories. If a stroke symbol subsequence matches a stroke entry which occurs in two or more of the dictionary memories 180, 182, 184 and 186, the language part selected as the translation will be the one corresponding to the stroke entry first matched to the stroke symbol subsequence. Consequently, a stroke symbol subsequence which matches a stroke entry in the job dictionary will take precedence over a match which would otherwise have occurred with a stroke entry in the master or fix dictionary.

Once the job dictionary is created on the word processor 170, it is loaded through the second port 156 of the processor 158 to the job dictionary 184. As the job dictionary is loading, the processor 158 may be programmed to check for illegal definitions or duplicate entries. Under such circumstances, a message can be displayed either on the translator display 132 (FIG. 1) or on the auxiliary display 160 instructing the operator on how to continue. When the processing of the job dictionary is completed and the job dictionary loaded into the job dictionary memory 184, the reset switch 138 (FIG. 1) is depressed to enable the receipt of stroke symbols from either the steno writer 110 or the storage device 152 through the first port 154.

The personal dictionary 182 is interconnected to the processor 158 so that an operator can enter individual steno definitions directly from the steno keyboard 112 without going through a word processor. The personal dictionary definition may be stored in the personal dictionary memory 182 by generating a control stroke symbol which, when applied to the processor 158, enables the processor to receive a dictionary word. Upon receiving the predefined control stroke symbol, the display 132 of the translator 158 will indicate to the operator "enter dictionary word". The operator then simply creates the word or phrase by either spelling out the word or writing the word using the steno keyboard 112. Once the word or phrase has been entered, another predefined control stroke symbol is again depressed on the steno keyboard 112 at which point the processor will display the message "enter dictionary strokes". The operator then depresses the keys on the steno keyboard 112 to define a plurality of lexical stroke symbols which are to be assigned to the previously entered dictionary word. Once the lexical stroke symbols have been entered, a predefined control stroke symbol indicating creation of a personal dictionary entry is again depressed and the defined keystrokes and associated dictionary word or phrase will be entered and stored in the personal dictionary memory 182.

The fix dictionary memory 180 includes stroke entries and associated language parts which constitute updates and special additions which would otherwise be incorporated into the master dictionary memory and are made so that a new master dictionary does not need to be created each time a small change is incorporated. Fix dictionary memory updates are made by modifying the data base of the processor 158 at a central location out of operator control.

In accordance with the invention, the order of searching for a match between a subsequence of stroke symbols received from a stroke symbol generator and a stroke entry in the memory 178 is to first search the personal dictionary memory 180, then the job dictionary memory 182, then the fix dictionary memory 184, and then the master dictionary memory 186. If a match is found at any point in the above sequence, searching is terminated as will be described hereafter.

The memory 178 also includes a scan chart memory 188. The scan chart memory includes only those parts of valid stroke symbols whose translation is a literal translation according to a predefined stroke reference chart (Table I). Stated differently, if a "list" of parts of lexical stroke symbols is defined where each part in the list has a letter or letter group associated therewith which define the "literal" translation of that part, and if a "literal" translation of a single lexical stroke symbol using that list yields a correct translation, then that lexical stroke symbol can be said to make itself upon translation according to the stroke reference chart.

Stroke symbols which make themselves upon translation according to the stroke reference chart (Table I) need not be stored in any of the fix, personal, job or master dictionary memories but can be stored in and translated solely by reference to the scan chart. All lexical stroke symbols which make themselves upon translation according to the stroke reference chart are identified and stored in a scan chart memory and are deleted from all other memories. An example of such a scan chart memory is set forth in Table II.

TABLE I

| QUICK REFERENCE CHART KEY COMBINATIONS | | | | | |
|---|---|---|---|---|---|
| Initial Consonants (Left Hand) | | Vowels (Thumbs) | | Final Consonants (Right Hand) | |
| b | /PW- | a | /A (short) | -b | /-B |
| c | /K- | a | /AEU (long) | -d | /-D |
| f-,ph | /TK- | e | /E (short) | hard f | /*-F |
| g | /TKPW- | e | /AOE (long) | -g | /-G |

TABLE I-continued

| QUICK REFERENCE CHART KEY COMBINATIONS | | | | | |
|---|---|---|---|---|---|
| Initial Consonants (Left Hand) | | Vowels (Thumbs) | | Final Consonants (Right Hand) | |
| h | /H- | i | /AOEU (long) | -j(-ge) | /-PBLG |
| j | /SKWR- | i | /EU (short) | -k | /-BG |
| c-,k- | /K- | o | /O (short) | -l | /-L |
| l | /HR- | o | /OE long) | -m | /-PL |
| m | /PH- | u | /U (short) | -n | /-PB |
| n | /TPH- | u | /AOU (long) | -p | /-P |
| p | /P | ou(ow) | /OU | -r | /-R |
| qu | /KW- | au(aw) | /AU | -s | /-S |
| r | /R- | oo(oo) | /AO | -t | /-T |
| s | /S | oi(oy) | /OEU (y-end) | -v | /-F |
| t | /T- | | | -x | /-BGS |
| v | /SR- | | SUFFIX | -z | /-Z |
| w | /W- | | | -ch | /-FP |
| x | /KP- | a | /A | -rch | /-FRP |
| y | /KWR- | e | /AOERBGS | -nch | /-FRPB |
| z | /S*- | i | /EURBGS | -ng | /-PBG |
| shr | /SKHR- | o,ow | /OE | -nk | /-FRPBG |
| sch | /SKH- | ue | /AOU | -nge | /-FRPBLG |
| | | u | /AOURBGS | -rf | /-FR |
| | | y | /E | -rve | /-FRB |
| | | ee | /AOE | -mp | /-FPL |
| | | | | -mpt | /-FPLT |
| | | | | -sh | /-RB |
| | | | | -nsion | /-PBGZ |
| | | | | -st | /-FT |
| | | | | -rst | /-FRT |
| | | | | -sk,sque | /-FBG |
| | | | | -lge | /-LG |
| | | | | -rge | /-RPBLG |
| | | | | -ngth | /-PBGT |
| | | | | -ch-tch | /-FP |
| | | | | -lth | /-LGT |
| | | | | -rth | /-RGT |
| | | | | -th | /-GT |
| | | | | -ssion | /-GZ |
| | | | | -ction | /-BGZ |
| | | | | -nct | /-FRPBGT |
| | | | | -nction | /-FRPBGZ |
| | | | | -ttle | /-LGTS |
| | | | | -ddle | /-TSDZ |

TABLE II

| Initial Consonants (Left Hand) | | Vowels (Thumbs) | |
|---|---|---|---|
| Translation | Stroke | Translation | Stroke |
| r/ | R | | |
| h/ | H | a | /A (short) |
| l/ | HR | a | /AEU (long) |
| w/ | W | e | /E (short) |
| wr/ | W R | e | /AOE (long) |
| wh/ | W H | i | /AOEU (long) |
| p/ | P | i | /EU (short) |
| m/ | P H | o | /O (short) |
| pl/ | P HR | o | /OE (long) |
| b/ | PW | u | /U (short) |
| br/ | PW R | u | /AOU (long) |
| bl/ | PW HR | ou(ow) | /OU |
| c/ | K | au(aw) | /AU |
| cr/ | K R | oo(oo) | /AO |
| ch/ | K H | oi(oy) | /OEU (y-end) |
| cl/ | K HR | | |
| qu/ | K W | | |
| y/ | K W R | | |
| t/ | T | | |
| tr/ | T R | | |
| th/ | T H | | |
| thr/ | T H R | | |
| tw/ | T W | | |
| f/ | T P | | |
| fr/ | TP R | | |
| n/ | TPH | | |
| fl/ | TP HR | | |
| d/ | TK | | |
| dr/ | TK R | | |
| g/ | TKPW | | |
| gr/ | TKPW R | | |
| s/ | S | | |
| v/ | SR | | |
| sh/ | SH | | |
| sl/ | S HR | | |
| sw/ | S W | | |
| sp/ | S P | | |
| spr/ | S P R | | |
| sm/ | S PH | | |
| spl/ | S P HR | | |
| sc/ | S K | | |
| scr/ | S K R | | |
| shr/ | S K HR | | |
| sq/ | S KW | | |
| st/ | S T | | |
| str/ | S T R | | |
| sph/ | S TP | | |

Vowels/Final Consonant
(Thumbs/Right Hand)

Translation/Stroke

```
enge/     E    FRPBLG
inge/     EU   FRPBLG
onge/     O    FRPBLG
ounge/    O U  FRPBLG
ange/     A    FRPBLG
aunge/    A U  FRPBLG
ange/     A EU FRPBLG
unges/    U    FRPBLG    Z
enges/    E    FRPBLG    Z
inges/    EU   FRPBLG    Z
onges/    O    FRPBLG    Z
ounges/   O U  FRPBLG    Z
anges/    A    FRPBLG    Z
aunges/   A U  FRPBLG    Z
unged/    U    FRPBLG    D
enged/    E    FRPBLG    D
inged/    EU   FRPBLG    D
onged/    O    FRPBLG    D
ounged/   O U  FRPBLG    D
anged/    A    FRPBLG    D
aunged/   A U  FRPBLG    D
anged/    A EU FRPBLG    D
orch/     O    FRP
orch/     OE   FRP
arch/     A    FRP
urches/   U    FRP       Z
erches/   E    FRP       Z
irches/   EU   FRP       Z
orches/   O    FRP       Z
orches/   OE   FRP       Z
arches/   A    FRP       Z
urched/   U    FRP       D
erched/   E    FRP       D
irched/   EU   FRP       D
orched/   O    FRP       D
orched/   OE   FRP       D
arched/   A    FRP       D
urching/  U    FRP    G
erching/  E    FRP    G
irching/  EU   FRP    G
orching/  O    FRP    G
arching/  A    FRP    G
unch/     U    FRPB
ench/     E    FRPB
inch/     EU   FRPB
onch/     O    FRPB
```

Translation/Stroke

```
ounch/    O U  FRPB
anch/     A    FRPB
aunch/    A U  FRPB
unches/   U    FRPB      Z
enches/   E    FRPB      Z
inches/   EU   FRPB      Z
onches/   O    FRPB      Z
ounches/  O U  FRPB      Z
anches/   A    FRPB      Z
aunches/  A U  FRPB      Z
unched/   U    FRPB      D
enched/   E    FRPB      D
inched/   EU   FRPB      D
onched/   O    FRPB      D
ounched/  O U  FRPB      D
anched/   A    FRPB      D
aunched/  A U  FRPB      D
unching/  U    FRPB   G
enching/  E    FRPB   G
inching/  EU   FRPB   G
onching/  O    FRPB   G
anching/  A    FRPB   G
unction/  U    FRPB   G  Z
inction/  EU   FRPB   G  Z
unked/    U    FRPB   G  D
enked/    E    FRPB   G  D
inked/    EU   FRPB   G  D
onked/    O    FRPB   G  D
anked/    A    FRPB   G  D
anked/    A EU FRPB   G  D
unge/     U    FRPBLG
omps/     O    F P L S
ompts/    O    F P L TS
amps/     A    F P L     Z
umped/    U    F P L     D
emped/    E    F P L     D
imped/    EU   F P L     D
omped/    O    F P L     D
amped/    A    F P L     D
umption/  U    F P LG    Z
emption/  E    F P LG    Z
urf/      U    FR
urst/     U    FR        T
ursts/    U    FR        TS
erf/      E    FR
erst/     E    FR        T
```

```
ersts/   E  FR     TS              ouch/    O U F P
irf/     EU FR                     oach/    OE  F P
irst/    EU FR     T               atch/    A   F P
irsts/   EU FR     TS              auch/    A U F P
orf/     O  FR                     ooch/    AO  F P
orst/    O  FR     T               eech/    AOE F P
orsts/   O  FR     TS              eeches/  E   F P      Z
arf/     A  FR                     itches/  EU  F P      Z
aver/    A EU FR                   otches/  O   F P      Z
urfs/    U FR           Z          ouches/  O U F P      Z
erfs/    E  FR          Z          oaches/  OE  F P      Z
ivers/   EU FR          Z          atches/  A   F P      Z
arfs/    A  FR          Z          ooches/  AO  F P      Z
arfed/   A  FR          D          eeches/  AOE F P      Z
urfing/  U FR      G               etched/  E   F P      D
ivering/ EU FR     G               itched/  EU  F P      D
overing/ O  FR     G               otched/  O   F P      D
urve/    U  FR B                   oached/  OE  F P      D
erve/    E  FR B                   atched/  A   F P      D
irve/    EU FR B                   ooched/  AO  F P      D
orve/    O  FR B                   eeched/  AOE F P      D
arve/    A  FR B                   etching/ E   F P G
urves/   U  FR B        Z          itching/ EU  F P G
erves/   E  FR B        Z          otching/ O   F P G
irves/   EU FR B        Z          oaching/ OE  F P G
orves/   O  FR B        Z          atching/ A   F P G
arves/   A  FR B        Z          ooching/ AO  F P G
urved/   U  FR B        D          eeching/ AOE F P G
erved/   E  FR B        D          ump/     U F P L
irved/   EU FR B        D          umpt/    U F P L T
orved/   O  FR B        D          emp/     E F P L
arved/   A  FR B        D          empt/    E F P L T
urving/  U  FR B G                 imp/     EU F P L
erving/  E  FR B G                 impt/    EU F P L T
irving/  EU FR B G                 omp/     O  F P L
orving/  O  FR B G                 ompt/    O  F P L T
arving/  A  FR B G                 amp/     A  F P L
urch/    U FRP                     ampt/    A  F P L T
erch/    E  FRP                    umps/    U F P L   Z
irch/    EU FRP                    emps/    E F P L   Z
alves    A  F  L        Z          empts/   E F P L TS
elved/   E  F  L        D          imps/    EU F P L S
olved/   O  F  L        D          arged/   A    RPBLG D
alved/   A  F  L        D          ove/     U F
usk/     U F  B G                  ust/     U F     T
esk/     E F  B G                  usts/    U F     TS
isk/     EU F B G                  ev/      E  F
osk/     O  F B G                  est/     E  F    T
ask/     A  F B G                  ests/    E  F    TS
utch/    U F P                     ive/     EU F
etch/    E F P                     ist/     EU F    T
itch/    EU F P                    ists/    EU F    TS
otch/    O  F P                    ov/      O  F
```

```
ost/     O    F       T
osts/    O    F       TS
ouv/     O U  F
oust/    O U  F       T
ousts/   O U  F       TS
ove/     OE   F
oast/    OE   F       T
oasts/   OE   F       TS
oist/    OEU  F       T
av/      A    F
ast/     A    F       T
asts/    A    F       TS
aust/    A U  F       T
ave/     A E  F
ave/     A EU F
aste/    A EU F       T
astes/   A EU F       TS
oof/     AO   F
oofs/    AO   F       S
eave/    AOE  F
eaves/   AOE  F       S
ives/    AOEU F
ives/    AOEU F       S
oves/    U  F                Z
evs/     E  F                Z
ives/    EU F                Z
ovsO     F                   Z
oves/    OE F                Z
avs/     A  F                Z
aves/    A EU F              Z
ooves/   AO    F             Z
eaves/   AOE   F             Z
ives/    AOEU  F             Z
ived/    EU F          D
iving/   EU F          G
aving/   A EU F        G
oofing/  AO    F       G
eaving/  AOE   F       G
iving/   AOEU  F       G
ulve/    U  F       L
elve/    E  F       L
olve/    O  F       L
alve/    A  F       L
olves/   O  F       L    Z
erm/     .E    RP L
irm/     EU    RP L
orm/     O     RP L
orm/     OE    RP L
arm/     A     RP L
urms/    U     RP L      Z
erms/    E     RP L      Z
irms/    EU    RP L      Z orms/    O     RP L      Z
orms/    OE    RP L      Z
arms/    A     RP L      Z
ermed/   E     RP L      D
irmed/   EU    RP L      D
armed/   A     RP L      D
urn/     U     RPB
ern/     E     RPB
irn/     EU    RPB
orn/     O     RPB
orn/     OE    RPB
arn/     A     RPB
urns/    U     RPB       Z
erns/    E     RPB       Z
irns/    EU    RPB       Z
orns/    O     RPB       Z
orns/    OE    RPB       Z
arns/    A     RPB       Z
urning/  U     RPB  G
erning/  E     RPB  G
urge/    U     RPBLG
urges/   U     RPBLG  S
erge/    E     RPBLG
erges/   E     RPBLG  S
irge/    EU    RPBLG
irges/   EU    RPBLG  S
orge/    O     RPBLG
orges/   O     RPBLG  S
ourge/   O U   RPBLG
ourges/  O U   RPBLG  S
orge/    OE    RPBLG
orges/   OE    RPBLG  S
arge/    A     RPBLG
arges/   A     RPBLG  S
urges/   U     RPBLG     Z
erges/   E     RPBLG     Z
irges/   EU    RPBLG     Z
orges/   O     RPBLG     Z
ourges/  O U   RPBLG     Z
orges/   OE    RPBLG     Z
arges/   A     RPBLG     Z
urged/   U     RPBLG     D
erged/   E     RPBLG     D
irged/   EU    RPBLG     D
orged/   O     RPBLG     D
ourged/  O U   RPBLG     D
orged/   OE    RPBLG     D
ortion/  OE    R     G   Z
url/     U     R  L
erl/     E     R  L
irl/     EU    R  L
orl/     O     R  L
```

```
orl/    OE    R  L
arl/    A     R  L
arlt/   A     R  L   T
urls/   U     R  L       Z
erls/   E     R  L       Z
irls/   EU    R  L       Z
orls/   O     R  L       Z
orls/   OE    R  L       Z
arls/   A     R  L       Z
urled/  U     R  L   D
urb/    U     R  B
erb/    E     R  B
ish/    EU    R  B
icious/ EU    R  B   S
osh/    O     R  B
orb/    OE    R  B
ash/    A     R  B
acious/ A     R  B   S
acious/ A  EU R  B       Z
urk/    U     R  B G
urks/   U     R  B G S
erk/    E     R  B G
erks/   E     R  B G S
irk/    EU    R  B G
irks/   EU    R  B G S
ork/    O     R  B G
orks/   O     R  B G S
ork/    OE    R  B G
orks/   OE    R  B G S
ark/    A     R  B G
arks/   A     R  B G S
arction/ A    R  B G     Z
erked/  E     R  B G D
arked/  A     R  B G D
urp/    U     RP
erp/    E     RP
irp/    EU    RP
orp/    O     RP
orp/    OE    RP
arp/    A     RP
urps/   U     RP         Z
erps/   E     RP         Z
irps/   EU    RP         Z
orps/   O     RP         Z
orps/   OE    RP         Z
arps/   A     RP         Z
urped/  U     RP     D
erped/  E     RP     D
arped/  A     RP     D
urm/    U     RP L irs/    EU    R          Z
ors/    O     R          Z
owers/  O  U  R          Z
ores/   OE    R          Z
ars/    A     R          Z
ares/   A  E  R          Z
airs/   A  EU R          Z
oors/   AO    R          Z
ures/   AO U  R          Z
eers/   AOE   R          Z
ires/   AOEU  R          Z
urd/    U     R      D
ursed/  U     R      SD
erd/    E     R      D
ersed/  E     R      SD
ird/    EU    R      D
ord/    O     R      D
orsed/  O     R      SD
ord/    OE    R      D
orsed/  OE    R      SD
ard/    A     R      D
aired/  A  EU R          D
oored/  AO    R          D
ured/   AO U  R          D
eered/  AOE   R          D
ired/   AOEU  R          D
urds/   U     R          DZ
erds/   E     R          DZ
irds/   EU    R          DZ
ords/   O     R          DZ
ords/   OE    R          DZ
ards/   A     R          DZ
urg/    U     R      G
urgs/   U     R      G S
urth/   U     R      GT
urths/  U     R      GTS
erg/    E     R      G
ergs/   E     R      G S
erth/   E     R      GT
erths/  E     R      GTS
irg/    EU    R      G
irth/   EU    R      GT
irths/  EU    R      GTS
org/    O     R      G
orgs/   O     R      G S
orth/   O     R      GT
orths/  O     R      GTS
org/    OE    R      G
orgs/   OE    R      G S
orth/   OE    R      GT
```

```
arg/     A       R    G
args/    A       R    G  S
arth/    A       R    GT
ersion/  E       R    G      Z
ortion/  O       R    G      Z
idge/   EU     PBLG
odge/    O     PBLG
adge/    A     PBLG
auge/    A U   PBLG
age/     A EU  PBLG
uge/    AO U   PBLG
ege/    AOE    PBLG
udges/   U     PBLG     Z
edges/   E     PBLG     Z
idges/  EU     PBLG     Z
odges/   O     PBLG     Z
adges/   A     PBLG     Z
auges/   A U   PBLG     Z
ages/    A EU  PBLG     Z
uges/   AO U   PBLG     Z
udged/   U     PBLG  D
edged/   E     PBLG  D
idged/  EU     PBLG  D
odged/   O     PBLG  D
adged/   A     PBLG  D
aged/    A EU  PBLG  D
uged/   AO U   PBLG  D
ur/      U       R
urse/    U       R    S
urt/     U       R    T
urts/    U       R    TS
er/      E       R
erse/    E       R    S
ert/     E       R    T
erts/    E       R    TS
ir/     EU       R
irt/    EU       R    T
irts/   EU       R    TS
or/      O       R
orse/    O       R    S
ort/     O       R    T
orts/    O       R    TS
our/     O U     R
ore/    OE       R
orse/   OE       R    S
ort/    OE       R    T
orts/   OE       R    TS
ar/      A       R
arse/    A       R    S
art/     A       R    T
arts/    A       R    TS
aur/     A U     R
are/     A E     R
air/     A EU    R
oor/    AO       R ure/    AO U     R
eer/    AOE      R
ire/    AOEU     R
urs/     U       R         Z
ers/     E       R         Z
end/     E       PB   D
enced/   E       PB   SD
ind/    EU       PB   D
inced/  EU       PB   SD
ond/     O       PB   D
onced/   O       PB   SD
ound/    O U     PB   D
ounced/  O U     PB   SD
oined/  OEU      PB   D
and/     A       PB   D
anced/   A       PB   SD
ained/   A EU    PB   D
ooned/  AO       PB   D
uned/   AO U     PB   D
eened/  AOE      PB   D
ind/    AOEU     PB   D
unds/    U       PB   DZ
ends/    E       PB   DZ
inds/   EU       PB   DZ
onds/    O       PB   DZ
unds/    U       PB   DZ
ands/    A       PB   DZ
inds/   AOEU     PB   DZ
ung/     U       PB G
ungs/    U       PB G  S
unth/    U       PB GT
unths/   U       PB GTS
eng/     E       PB G
engs/    E       PB G  S
enth/    E       PB GT
enths/   E       PB GTS
ing/    EU       PB G
ings/   EU       PB G  S
inth/   EU       PB GT
inths/  EU       PB GTS
ong/     O       PB G
ongs/    O       PB G  S
onth/    O       PB GT
onths/   O       PB GTS
ang/     A       PB G
angs/    A       PB G  S
anth/    A       PB GT
anths/   A       PB GTS
ang/     A EU    PB G
angs/    A EU    PB G  S
uning/  AO U     PB G
ension/  E       PB G       Z
unged/   U       PB G  D
enged/   E       PB G  D
inged/  EU       PB G  D
```

```
onged/   O      PB G  D
anged/   A      PB G  D
anged/   A EU   PB G  D
udge/    U   PBLG
edge/    E   PBLG
ence/    E  PB S
ent/     E  PB T
ents/    E  PB TS
in/     EU  PB
ince/   EU  PB S
int/    EU  PB T
ints/   EU  PB TS
on/      O  PB
once/    O  PB S
ont/     O  PB T
onts/    O  PB TS
own/     O U  PB
ounce/   O U  PB S
ount/    O U  PB T
ounts/   O U  PB TS
one/    OE  PB
oin/    OEU  PB
oint/   OEU  PB T
oints/  OEU  PB TS
an/      A  PB
ance/    A  PB S
ant/     A  PB T
ants/    A  PB TS
aun/     A U  PB
aunce/   A U  PB S
aunt/    A U  PB T
aunts/   A U  PB TS
ane/     A E  PB
ain/     A EU  PB
aint/    A EU  PB T
aints/   A EU  PB TS
oon/    AO  PB
une/    AO U  PB
uence/  AO U  PB S
uent/   AO U  PB T
uents/  AO U  PB TS
een/    AOE  PB
ine/    AOEU  PB
uns/     U   PB    z
ens/     E   PB    z
ins/    EU   PB    z
ons/     O   PB    z
owns/    O U  PB   z
ones/   OE   PB    z
oins/   OEU  PB    z
ans/     A   PB    z
auns/    A U  PB   z anes/    A E   PB    z
ains/    A EU  PB    z
oons/   AO    PB    z
unes/   AO U  PB    z
eens/   AOE   PB    z
ines/   AOEU  PB    z
und/     U    PB    D
unced/   U    PB   SD
ur/      U     P L
er/      E     P L
ir/     EU     P L
or/      O     P L
ore/    OE     P L
ar/      A     P L
aur/     A U   P L
are/     A E   P L
are/     A EU  P L
oor/    AO     P L
ure/    AO U   P L
eer/    AOE    P L
ire/    AOEU   P L
urs/     U     P L    z
ers/     E     P L    z
irs/    EU     P L    z
ors/     O     P L    z
ores/   OE     P L    z
ars/     A     P L    z
aurs/    A U   P L    z
ares/    A E   P L    z
ares/    A EU  P L    z
oors/   AO     P L    z
ures/   AO U   P L    z
eers/   AOE    P L    z
ires/   AOEU   P L    z
urred/   U     P L    D
erred/   E     P L    D
irred/  EU     P L    D
orred/   O     P L    D
ored/   OE     P L    D
arred/   A     P L    D
aured/   A U   P L    D
ared/    A E   P L    D
ared/    A EU  P L    D
oored/  AO     P L    D
ured/   AO U   P L    D
eered/  AOE    P L    D
ired/   AOEU   P L    D
urring/  U     P LG
erring/  E     P LG
irring/ EU     P LG
orring/  O     P LG
oring/  OE     P LG
```

```
anning/    A         P LG
aning/     A EU      P LG
ooning/    AO        P LG
uning/     AO U      P LG
eening/    AOE       P LG
ining/     AOEU      P LG
un/        U PB
unce/      U PB  S
unt/       U PB  T
unts/      U PB  TS
en/        E PB
aupt/      A  U      P    T
aupts/     A  U      P    TS
ape/       A EU      P
oop/       AO        P
upe/       AO U      P
eep/       AOE       P
ipe/       AOEU      P
ups/       U         P         Z
eps/       E         P         Z
ips/       EU        P         Z
ops/       O         P         Z
opes/      OE        P         Z
aps/       A         P         Z
apes/      A EU      P         Z
oops/      AO        P         Z
upes/      AO U      P         Z
eeps/      AOE       P         Z
ipes/      AOEU      P         Z
upped/     U         P      D
epped/     E         P      D
ipped/     EU        P      D
opped/     O         P      D
oped/      OE        P      D
apped/     A         P      D
aped/      A EU      P      D
ooped/     AO        P      D
uped/      AO U      P      D
eeped/     AOE       P      D
iped/      AOEU      P      D
upping/    U         P    G
uppings/   U         P    G S
epping/    E         P    G
eppings/   E         P    G S
ipping/    EU        P    G
ippings/   EU        P    G S
opping/    O         P    G
oppings/   O         P    G S
oping/     OE        P    G
apping/    A         P    G
appings/   A         P    G S aping/     A EU      P    G
apings/    A EU      P    G S
ooping/    AO        P    G
oopings/   AO        P    G S
uping/     AO U      P    G
upings/    AO U      P    G S
eeping/    AOE       P    G
eepings/   AOE       P    G S
iping/     AOEU      P    G
ipings/    AOEU      P    G S
uption/    U         P    G   Z
eption/    E         P    G   Z
iption/    EU        P    G   Z
option/    O         P    G   Z
aption/    A         P    G   Z
oction/    O           B G   Z
action/    A           B G   Z
ucked/     U           B G D
ecked/     E           B G D
icked/     EU          B G D
ocked/     O           B G D
oked/      OE          B G D
acked/     A           B G D
alked/     A  U        B G D
aked/      A EU        B G D
ooked/     AO          B G D
uked/      AO U        B G D
eeked/     AOE         B G D
iked/      AOEU        B G D
ouble/     U         BL
ebble/     E         BL
ibble/     EU        BL
obble/     O         BL
obal/      OE        BL
abble/     A         BL
auble/     A  U      BL
able/      A EU      BL
oubles/    U         BL      Z
ebbles/    E         BL      Z
ibbles/    EU        BL      Z
obbles/    O         BL      Z
abbles/    A         BL      Z
aubles/    A  U      BL      Z
ables/     A EU      BL      Z
oubled/    U         BL   D
ibbled/    EU        BL   D
obbled/    O         BL   D
abbled/    A         BL   D
aubled/    A  U      BL   D
abled/     A EU      BL   D
up/        U         P
```

```
upt/    U  P  T
upts/   U  P  TS
ep/     E     P
ept/    E     P     T
epts/   E     P     TS
ip/     EU    P
ipt/    EU    P     T
ipts/   EU    P     TS
op/     O     P
opt/    O     P     T
opts/   O     P     TS
oup/    O U   P
oupt/   O U   P     T
oupts/  O U   P     TS
ope/    OE    P
ap/     A     P
apt/    A     P     T
apts/   A     P     TS
aup/    A U   P
obs/    O        B        Z
oubs/   O U      B        Z
obes/   OE       B        Z
abs/    A        B        Z
aubs/   A U      B        Z
abes/   A EU     B        Z
oobs/   AO       B        Z
ubes/   AO U     B        Z
eebs/   AOE      B        Z
ibes/   AOEU     B        Z
ubbed/  U        B        D
ebbed/  E        B        D
ibbed/  EU       B        D
obbed/  O        B        D
obed/   OE       B        D
abbed/  A        B        D
oobed/  AO       B        D
ubed/   AO U     B        D
ibed/   AOEU     B        D
uck/    U        B  G
ux/     U        B  G S
uct/    U        B  GT
ucts/   U        B  GTS
eck/    E        B  G
ex/     E        B  G S
ect/    E        B  GT
ects/   E        B  GTS
ick/    EU       B  G
ix/     EU       B  G S
ict/    EU       B  GT
icts/   EU       B  GTS
ock/    O        B  G ox/     O        B  G S
oct/    O        B  GT
octs/   O        B  GTS
oke/    OE       B  G
ack/    A        B  G
ax/     A        B  G S
act/    A        B  GT
acts/   A        B  GTS
alk/    A U      B  G
ake/    A E      B  G
ake/    A EU     B  G
akes/   A EU     B  G S
ook/    AO       B  G
ooks/   AO       B  G S
uke/    AO U     B  G
ukes/   AO U     B  G S
eek/    AOE      B  G
eeks/   AOE      B  G S
ike/    AOEU     B  G
ikes/   AOEU     B  G S
uction/ U        B  G     Z
ection/ E        B  G     Z
iction/ EU       B  G     Z
eeled/  AOE         L     D
iled/   AOEU        L     D
ulds/   U           L     DZ
elds/   E           L     DZ
ilds/   EU          L     DZ
olds/   O           L     DZ
alds/   A           L     DZ
ulge/   U           LG
ulges/  U           LG S
ulth/   U           LGT
uttle/  U           LGTS
elge/   E           LG
elges/  E           LG S
elth/   E           LGT
ettle/  E           LGTS
ilge/   EU          LG
ilges/  EU          LG S
ilth/   EU          LGT
ittle/  EU          LGTS
olge/   O           LG
olges/  O           LG S
olth/   O           LGT
ottle/  O           LGTS
alge/   A           LG
alges/  A           LG S
alth/   A           LGT
attle/  A           LGTS
ailing/ A EU        LG
```

```
ooling/  AO         LG
uling/   AO U       LG
eeling/  AOE        LG
ulsion/  U          LG   Z
elsion/  E          LG   Z
ulged/   U          LG D
elged/   E          LG D
ilged/   EU         LG D
alged/   A          LG D
ub/      U       B
eb/      E       B
ib/      EU      B
ibit/    EU      B  T
ob/      O       B
oub/     O U     B
obe/     OE      B
ab/      A       B
abit/    A       B  T
aub/     A U     B
abe/     A EU    B
oob/     AO      B
ube/     AO U    B
eeb/     AOE     B
ibe/     AOEU    B
ubs/     U       B     Z
ebs/     E       B     Z
ibs/     EU      B     Z
ult/     U       L T
ults/    U       L TS
el/      E       L
else/    E       L S
elt/     E       L T
elts/    E       L TS
il/      EU      L
ilce/    EU      L S
ilt/     EU      L T
ilts/    EU      L TS
ol/      O       L
olce/    O       L S
olt/     O       L T
olts/    O       L TS
owel/    O U     L
ole/     OE      L
olt/     OE      L T
olts/    OE      L TS
oil/     OEU     L
al/      A       L
alce/    A       L S
alt/     A       L T
alts/    A       L TS
aul/     A U     L ault/    A U     L T
ail/     A EU    L
ool/     AO      L
ule/     AO U    L
eel/     AOE     L
ile/     AOEU    L
uls/     U       L     Z
els/     E       L     Z
ils/     EU      L     Z
ols/     O       L     Z
owels/   O U     L     Z
oles/    OE      L     Z
oils/    OEU     L     Z
als/     A       L     Z
alls/    A U     L     Z
ails/    A EU    L     Z
ools/    AO      L     Z
ules/    AO U    L     Z
eels/    AOE     L     Z
iles/    AOEU    L     Z
uld/     U       L  D
eld/     E       L  D
ild/     EU      L  D
old/     O       L  D
old/     OE      L  D
oiled/   OEU     L  D
ald/     A       L  D
ald/     A U     L  D
ailed/   A EU    L  D
ooled/   AO      L  D
uled/    AO U    L  D
oods/    AO         DZ
udes/    AO U       DZ
eeds/    AOE        DZ
ides/    AOEU       DZ
ug/      U       G
ugs/     U       G S
uth/     U       GT
uths/    U       GTS
eg/      E       G
egs/     E       G S
eth/     E       GT
eths/    E       GTS
ig/      EU      G
igs/     EU      G S
ith/     EU      GT
iths/    EU      GTS
og/      O       G
ogs/     O       G S
oth/     O       GT
oths/    O       GTS
```

| | | |
|---|---|---|
| oug/ | O U | G |
| outh/ | O U | G T |
| ouths/ | O U | G T S |
| oge/ | OE | G |
| oth/ | OE | G T |
| ag/ | A | G |
| ags/ | A | G S |
| ath/ | A | G T |
| aths/ | A | G T S |
| aug/ | A U | G |
| age/ | A EU | G |
| ages/ | A EU | G S |
| athe/ | A EU | G T |
| athes/ | A EU | G T S |
| oog/ | AO | G |
| ooth/ | AO | G T |
| ooths/ | AO | G T S |
| uge/ | AO U | G |
| outh/ | AO U | G T |
| eage/ | AOE | G |
| eeth/ | AOE | G T |
| ithe/ | AOEU | G T |
| ession/ | E | G Z |
| ission/ | EU | G Z |
| otion/ | OE | G Z |
| assion/ | A | G Z |
| usion/ | AO U | G Z |
| esion/ | AOE | G Z |
| ugged/ | U | G D |
| egged/ | E | G D |
| igged/ | EU | G D |
| ogged/ | O | G D |
| agged/ | A | G D |
| ul/ | U | L |
| ulce/ | U | L S |
| us/ | U | S |
| ut/ | U | T |
| uts/ | U | T S |
| es/ | E | S |
| et/ | E | T |
| ets/ | E | T S |
| is/ | EU | S |
| it/ | EU | T |
| its/ | EU | T S |
| os/ | O | S |
| ot/ | O | T |
| ots/ | O | T S |
| ouse/ | O U | S |
| out/ | O U | T |
| outs/ | O U | T S |
| ose/ | OE | S |
| ote/ | OE | T |
| oats/ | OE | T S |
| oyce/ | OEU | S |
| as/ | A | S |
| at/ | A | T |
| ats/ | A | T S |
| auce/ | A U | S |
| aught/ | A U | T |
| ate/ | A E | T |
| ates/ | A E | T S |
| ace/ | A EU | S |
| ate/ | A EU | T |
| ates/ | A EU | T S |
| oose/ | AO | S |
| oot/ | AO | T |
| oots/ | AO | T S |
| uce/ | AO U | S |
| ute/ | AO U | T |
| utes/ | AO U | T S |
| eese/ | AOE | S |
| eet/ | AOE | T |
| eets/ | AOE | T S |
| ice/ | AOEU | S |
| ight/ | AOEU | T |
| ights/ | AOEU | T S |
| uz/ | U | Z |
| uss/ | U | S Z |
| ez/ | E | Z |
| ess/ | E | S Z |
| iz/ | EU | Z |
| iss/ | EU | S Z |
| oz/ | O | Z |
| oss/ | O | S Z |
| ouse/ | O U | Z |
| ose/ | OE | Z |
| oise / | OEU | Z |
| az/ | A | Z |
| ass/ | A | S Z |
| ause/ | A U | Z |
| ase/ | A EU | Z |
| ooze/ | AO | Z |
| use/ | AO U | Z |
| eeze/ | AOE | Z |
| ize/ | AOEU | Z |
| ud/ | U | D |
| ussed/ | U | S D |
| utted/ | U | T D |
| ed/ | E | D |
| essed/ | E | S D |
| etted/ | E | T D |
| id/ | EU | D |
| issed/ | EU | S D |
| itted/ | EU | T D |

```
od/    O              D
ossed/ O              SD
otted/ O              T D
oud/   O U            D
oused/ O U            SD
ode/   OE             D
osed/  OE             SD
oated/ OE             T D
oid/   OEU            D
ad/    A              D
assed/ A              SD
atted/ A              T D
aud/   A U            D
aused/ A U            SD
ade/   A E            D
ade/   A EU           D
aced/  A EU           SD
ood/   AO             D
oosed/ AO             SD
ooted/ AO             T D
ude/   AO U           D
uted/  AO U           T D
eed/   AOE            D
eased/ AOE            SD
eeted/ AOE            T D
ide/   AOEU           D
uds/   U          DZ
uddle/ U          TSDZ
eds/   E          DZ
eddle/ E          TSDZ
ids/   EU         DZ
iddle/ EU         TSDZ
ods/   O          DZ
oddle/ O          TSDZ
ouds/  O U        DZ
odes/  OE         DZ
ads/   A          DZ
addle/ A          TSDZ
auds/  A U        DZ
ades/  A EU       DZ
addle/ A EU           TSDZ
```

To illustrate, reference is made to FIG. 6D. In accordance with the above criteria, a list of language parts consisting of words and word parts are listed in column 726. The language parts in column 726 which are followed by asterisks are those which meet the criteria of "making themselves upon translation" according to the stroke reference chart (Table I). This chart was derived as a consequence of the stenographic writing methodology adopted.

The stenographic format adopted in accordance with the present invention divides lexical stroke symbols into three main parts. First, a left hand part which consists of all of the consonants and characters to the left of the first occurring vowel. The only exception is the letter U which is included as a left hand character if it immediately follows a Q. All Consonants which precede the first occurring vowel will necessarily be stroked with the operator's left hand in accordance with the stroking methodology using stenographic keyboards of either a conventional type or a modified conventional type. The middle part of a lexical stroke symbol consists of all vowels. The vowels will be stroked with either one or both thumbs and are categorized as long vowels, short vowels or y-ending vowels. Finally, the lexical stroke symbol may have a right hand part which consists of the one or more consonant characters following the last occurring vowel in the lexical stroke symbol. In accordance with the stenographic methodology and utilizing conventional stenographic stroking machines, the last occurring consonants in each lexical stroke symbol will be stroked by the operator's right hand.

Lexical stroke symbols need not include all parts. Hence, lexical stroke symbols may include a left hand/consonant part and a thumbs/vowel part without a right hand/consonant part or may include a vowel part and a right hand consonant part without a left hand or initial consonant part. The scan chart stores initial consonant, vowel and vowel/final consonant parts in sublists as scan chart entries as set forth in Table II. Equally feasible is the storage in the scan chart of an initial consonant part, a vowel part and a right consonant part. However, to minimize the number of exceptions which will have to be considered, it is preferred to combine the vowel and final consonant portions in a single sublist in the scan chart. Hence it can be seen that the criteria for dividing the stroke symbols into parts (left consonant, vowel and right consonant) are the same criteria used to categorize the scan chart sublists. Turning to FIG. 6D and in particular referring to the word "pring", the lexical stroke symbol is PR-EUPBG. The Initial Consonant (Left Hand) column in Table I shows that the literal translation of "P" is "p" and "R" is "r" yielding "pr". The "Vowels" column of Table I shows that "EU" is translated literally as "i" and the Final Consonants (Right Hand) column of Talbe I shows the "PBG" is literally translated as "ng". Combining the literal translations yields "pring" which is the correct translation. Hence, the literal translation of the stroke symbol "PR-EUPBG" according to the stroke reference chart results in a correct translation and hence "PR-EUPBG" makes itself upon translation. The word "pring" can therefore be translated by reference to the scan chart and can be deleted from the exception dictionary memory.

Similarly, the literal translation of the stroke symbol PR-EUPBS according to the stroke reference chart yields the word "prince" which is the proper, correctly spelled, English word translation. Hence, the stroke symbol PR-EUPBS and the corresponding language part "prince" can also be derived from the scan chart memory 188 (FIG. 2).

By contrast, the word "principal" is represented by a two lexical stroke symbol—namely PR-EUPBS and PA-L. If the stroke symbol PR-EUPBS is literally translated according to the stroke reference chart (Table I), the resultant English translation would be "prince". However, the proper spelling of "principal" requires an "i" not an "e" following the "c". Further, the word part PA-L literally translated results in "pal". However, the correct translation is "ipal". Therefore, the literal translation of the lexical stroke symbols representing the word "principal" do not "make themselves" upon literal translation according to the stroke reference chart and hence are not deleted from the exception dictionary memory.

Another illustration is the difference between the stroke symbol for PR-EUPL for the word "prim" which does make itself upon literal translation and therefore can be deleted from the master memory, and the word "perimeter" which starts with the same stroke symbol PR-EUPL to represent the word part "perim". As can be seen, however, the first letters of perimeter are "perim" not the literal translation "prim". Hence, the stroke symbols PR-EUPL and T-ER, while defined in the exception dictionary memory to mean "perimeter", do not form the word "perimeter" upon literal translation according to the stroke reference chart and hence must appear in the exception dictionary memory.

As a final illustration, the stroke symbol PR-EUG when translated by sound makes the work "prig" which is the literal translation for the stroke symbol PR-EUG. Hence, the proper translation will result from translation according to the scan chart. "Prig" can therefore be deleted from the master memory. The next word, "priggish" requires two strokes, one being PR-EUG which would be literally translated "prig" and another stroke EURB which if translated literally would mean "ish". However, combining "prig" and "ish" would yield "prigish" which is incorrect. Hence, "priggish" and its corresponding stroke symbol subsequence would have to be stored in the master memory 186. The method of applying lexical stroke symbols to the scan chart will be described hereafter.

Referring again to FIG. 2, the translator 130 may also have various auxiliary data base storage memories 190 and related operation software 196. For example, if the translator 130 incorporates a spelling checker 197 then an auxiliary spelling memory 192 may be incorporated in which various correctly spelled words are stored. Also, the translator 130 may incorporate steno teacher software 199 with an associated practice text memory 193 whereby an operator may access the system and interact with the translator 130 to learn the stenographic writing methodology used to operate the system and obtain translation of keystrokes in accordance with the invention.

The stenographic writing methodology which is defined and adopted consistent with the teaching of the invention incorporates the concept of "absolutes" whereby a certain defined number of words must be stroked in a particular way and in no other way to obtain the proper translation. Additionally, the stenographic writing methodology adopted in accordance with the present invention provides a means of writing homonyns where each like sounding homonym is stroked differently and hence generates a different language part translation.

In one embodiment of the invention a homonym dictionary 194 may be incorporated. Upon encountering a homonym, the translator 130 may in one mode output the homonym set surrounded by, for example, brackets. When editing, the improper word or words can simply be deleted. In this mode of operation, the operator can write whatever keystroke comes fastest and most easily and then select the proper spelling during an editing process. However, when stroking for literal accuracy, the homonym job dictionary is not used and the operator must stroke the proper keystrokes for each different spelling of the desired homonym.

In accordance with the translation system of the invention, a flag may be incorporated with stroke entries in the exception dictionary to indicate that the last letter of the word must be doubled before adding a suffix. Similarly, flags may be associated with language parts stored in the exception dictionary to identify those entries as suffixes or prefixes or as having other characteristics which would be useful in translating. Suffixes, prefixes, word roots, doubled last letter and y-ending word roots can also be identified in accordance with a predefined set of identifier rules in accordance with the stenographic methodology. For example, any stroke symbol identified as beginning with one or more consecutive consonants and ending with a short vowel (A, E, EU, O, U in the stroke reference chart—Table I) will be a prefix upon translation.

Other illustrative identifier rules defining prefixes include the rules:

(1) a stroke symbol which starts with a short vowel (A, E, EU, O, U) and ends with a consonant and includes an asterisk (*) stroked by the operator is a prefix;

(2) any stroke incorporating an asterisk (*) and not ending with a short vowels is a prefix; and (3) any stroke that starts with a long vowel and ends with a consonant is a prefix.

These rules are illustrative only and may be modified to account for exceptions or may be supplemented so as to define other strokes which when translated define prefixes. Also, special cases can be stored and flagged as prefixes in the exception dictionary.

When a prefix is defined, the translation of the prefix lexical stroke symbol will be attached to the next translated lexical stroke symbol without a space.

A similar treatment for suffixes is preprogrammed. For example, any stroke that begins with a short vowel and ends with a consonant will be a suffix; strokes which start with a consonant and end with a long vowel will generally be a suffix; and a stroke symbol predefined to be a suffix is a suffix. Again, any other identifier rule set to define suffixes may be adopted in accordance with the key stroking methodology adopted according to the present invention. The rule set may be implemented by programming (software) instructions based on the character of the stroke with selected special cases stored in the exception dictionary and flagged as suffixes or prefixes. Lexical stroke symbols not identified as suffixes or prefixes are defined as word roots.

In an alternative embodiment, the flags may be eliminated from the memory with program software being incorporated to recognize particular stroke symbols inputted by the operator as being a suffix or prefix according to the predefined set of rules. An illustration of a flag stored in the memory is shown in FIG. 6D where the right hand carrot followed by a slash 730 indicates that the language part is a prefix. Various other flags indicative of special treatment such as doubling the last letter of a word root when a suffix is attached are also possible.

Returning to FIG. 2, the translator 130 may further comprise grammar checker software 198 and the translation software 202 to be described hereafter.

As previously indicated, the translator 130 receives digitized stenographic keystroke inputs (stroke symbols) in a predefined format according to a predefined stenographic stroking methodology and generates translated text therefrom. The first port 154 is used for receiving such stroke symbol input from the stenographic writer 110 or a tape drive 152. The second port 156 is used for communication between the translator 130 and any other external device such as the computer 174, word processor 170, printer 168, or other suitable device via an internal protocol converter or emulator 157 which coordinates the data format and rates of the translator 130 with the data format nd rate of whatever device is coupled to the second port 156. The translator 130 can then provide output data to or accept input data from any suitable device via the second port 156. It will be appreciated that the protocol converter (emulator) 157 may actually be several devices, each allowing the processor 158 to communicate with a different auxiliary device.

Figure 3A:
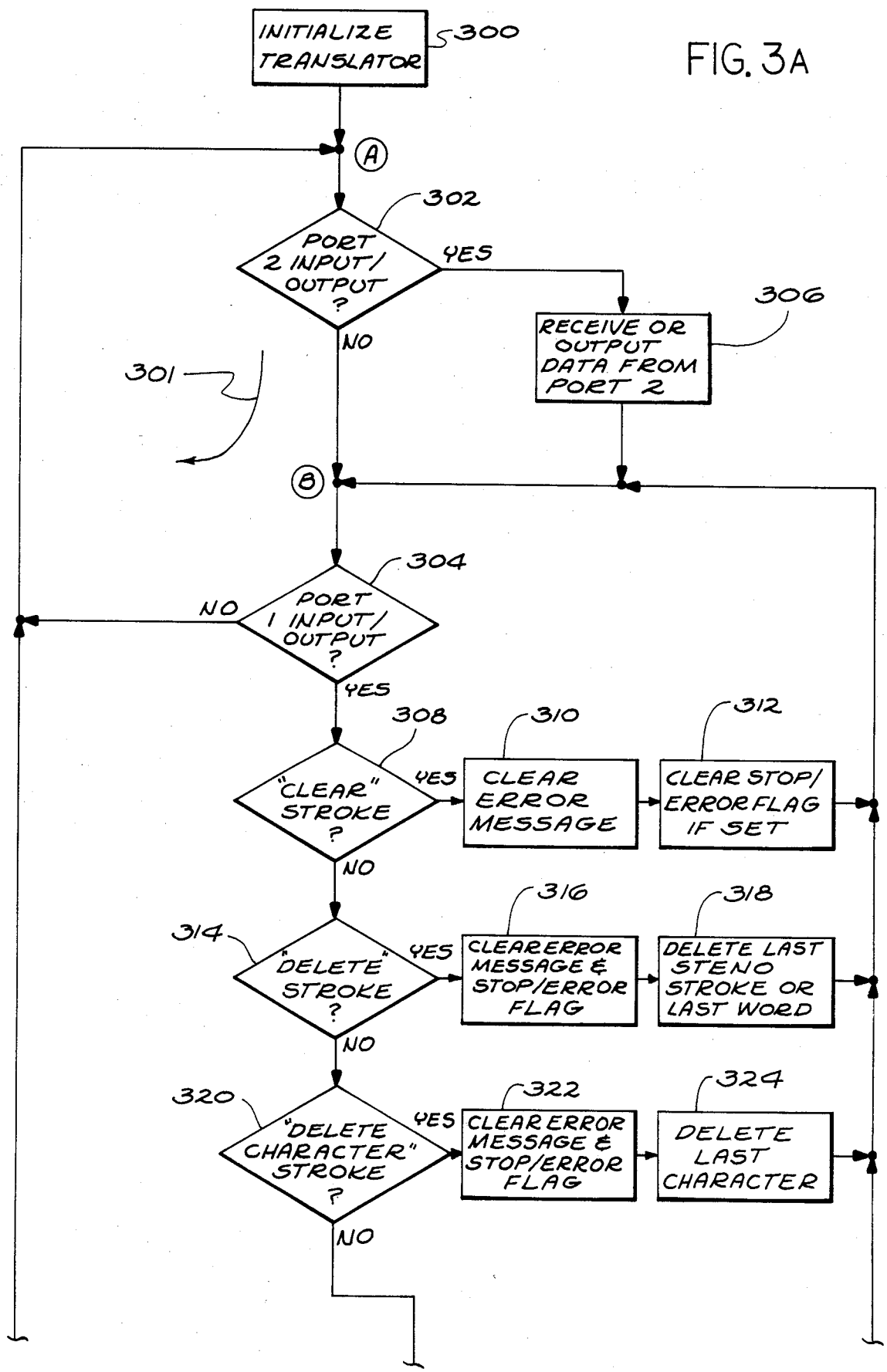
FIGS. 3A and 3B are block diagrams of an illustrative method of operating the translator in response to control stroke symbols.

The concept of operation of the processor 158 may be understood with reference to FIG. 3A. Specifically, the processor 158 first initializes the system (block 300) so that the translator 130 is ready to receive data through either port 2 or port 1. After initialization is completed, the processor 120 remains in an idle loop 301 where it alternately looks at port 2 (block 302) and port 1 (block 304) to determine if there is data at either port 2 or port 1. If data is detected at port 2 then the processor receives and operates on that data (block 306) in the predetermined manner. For example, if there is word processor input, such as the inputting of a job dictionary, data will be detected at port 2 and will be received and appropriately operated on and then stored in the job dictionary memory as previously described. Additionally, instructions or data may be outputted from port 2 to an auxiliary device such as a word processor, voice synthesizer or the like. Such data input and output through port 2 may be accomplished in block 306 in a conventional manner.

The processor 158 next looks at port 1 to determine if there is any input from or output to the stroke symbol generator 110 (FIG. 2). If no input or output appears at port 1, the processor 158 will return to its initial condition and will again look at port 2 for data. This looping process continues as long as data is not being received on either port 2 or port 1.

Figure 3B:
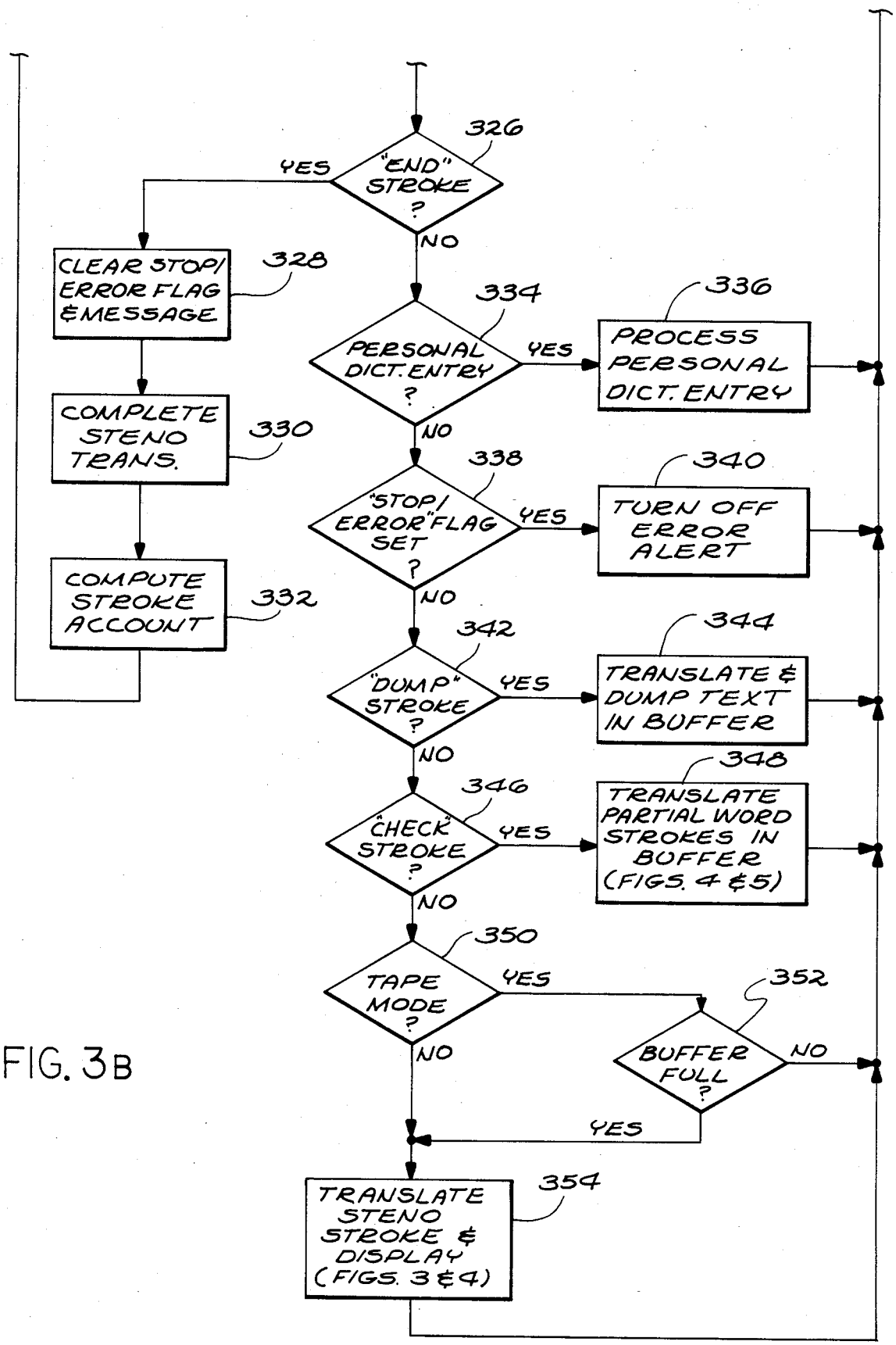

If a stroke symbol appears at port 1, then the processor 158 determines whether it is a lexical stroke symbol representing a language part, such as a suffix, prefix, word part, punctuation or other language symbol, or is a control stroke symbol whereby the processor is instructed to perform some function in the system. The remaining blocks of FIGS. 3A and 3B illustrate a typical operation which results from detecting a control stroke symbol. If the control stroke symbol is a "clear" stroke (block 308) then any error message which has been displayed on the processor is cleared (block 310) and the stop/error flag is reset or otherwise cleared if it had been previously set (block 312). If an error has been detected, the processor, at the option of the operator, may set an error flag which inhibits further functioning of the translator and stroke symbol generator 110 until the operator has either corrected the error or has inputted a "clear" stroke symbol via the steno keyboard.

Upon completing the clearing of the error flag, the processor will return to the idle loop 301. If the inputted control stroke symbol is not a "clear" stroke then the processor next tests to determine if it is a "delete" stroke (block 314). If it is, any error message is deleted and the stop/error flag reset (block 316) and the most recently translated word is deleted if the data came from a tape and the last steno stroke is deleted if the input came from the steno keyboard (block 318). The program then returns to the idle loop 301.

If the control stroke symbol is not a "delete" stroke, the processor next tests to determine if it is a "delete character" stroke (block 320). If so, then any error message is cleared and the stop/error flag is reset (block 322) and the last character of the language part translation is deleted (block 324). Again the program returns to the idle loop 301.

If the stroke symbol is not a "delete character" stroke then the processor next tests to determine if it is an "end" stroke (block 326). If it is, then any displayed error message on the display, if any, is cleared and the stop/error flag is reset (block 328). Any remaining lexical stroke symbols not yet translated are translated according to the procedure of FIGS. 4 and 5 (block 330), and a stroke account computed (block 332). The stroke account computes the number of lexical stroke symbols translated since the initialization process and if desired, displays that count for purposes of billing and the like. The program then returns to the idle loop 301.

If the stroke symbol is not an "end" stroke then the processor next determines whether the stroke symbol indicates that a personal dictionary entry is being made from the steno keyboard (block 334). If so, the processor interacts with the keyboard to perform the addition to the personal dictionary memory as previously described (block 336).

If the stroke symbol does not indicate entry of data into the personal dictionary memory, the processor next tests the stroke symbol to determine if it is a "stop/error" flag (block 338). If so, the processor turns off the error alert (block 340) and returns to the idle loop 301.

If the stroke symbol is not an "stop/error" entry the processor next tests to determine if it is a "dump" stroke (block 342). If so, the processor translates all text in a buffer used by the translator to store lexical steno strokes and outputs that text immediately (block 344). The program again goes to the idle loop 301.

If the stroke entry is not a "dump" stroke then the processor next checks to see if it is a "check" stroke (block 346). If so, then the processor causes any remaining lexical stroke symbols to be translated immediately (block 348) regardless of whether the translation makes a complete word or not. The processor again goes to the idle loop 301.

If the stroke symbol is not a "check" stroke then the processor tests to determine whether processing is being accomplished in the tape mode or not. In the tape mode, data is received through port 1 from a tape drive with the stroke symbols entries continuously inputted to a buffer. The buffer enables the operator to make a number of stroke symbol deletions for editing purposes. The buffer also evens out the rate of stroke symbols received by the translator and eliminates the need to check incoming stroke symbols to see if they are part of a subsequence since the entire subsequence is available in the buffer. Thus, if the processor determines that the processing is being done in tape mode (block 350) it first tests to determine if the buffer is full (block 352) and if not, then the processor returns to the main loop to await further data through port 1. When the buffer is full (block 352), the processor translates a selected portion of the contents of the buffer in a manner to be described hereafter (block 354). The translation done in blocks 330, 344, 348, and 354 may be accomplished in accordance with the flow charts of FIGS. 4 and 5.

Figure 4:
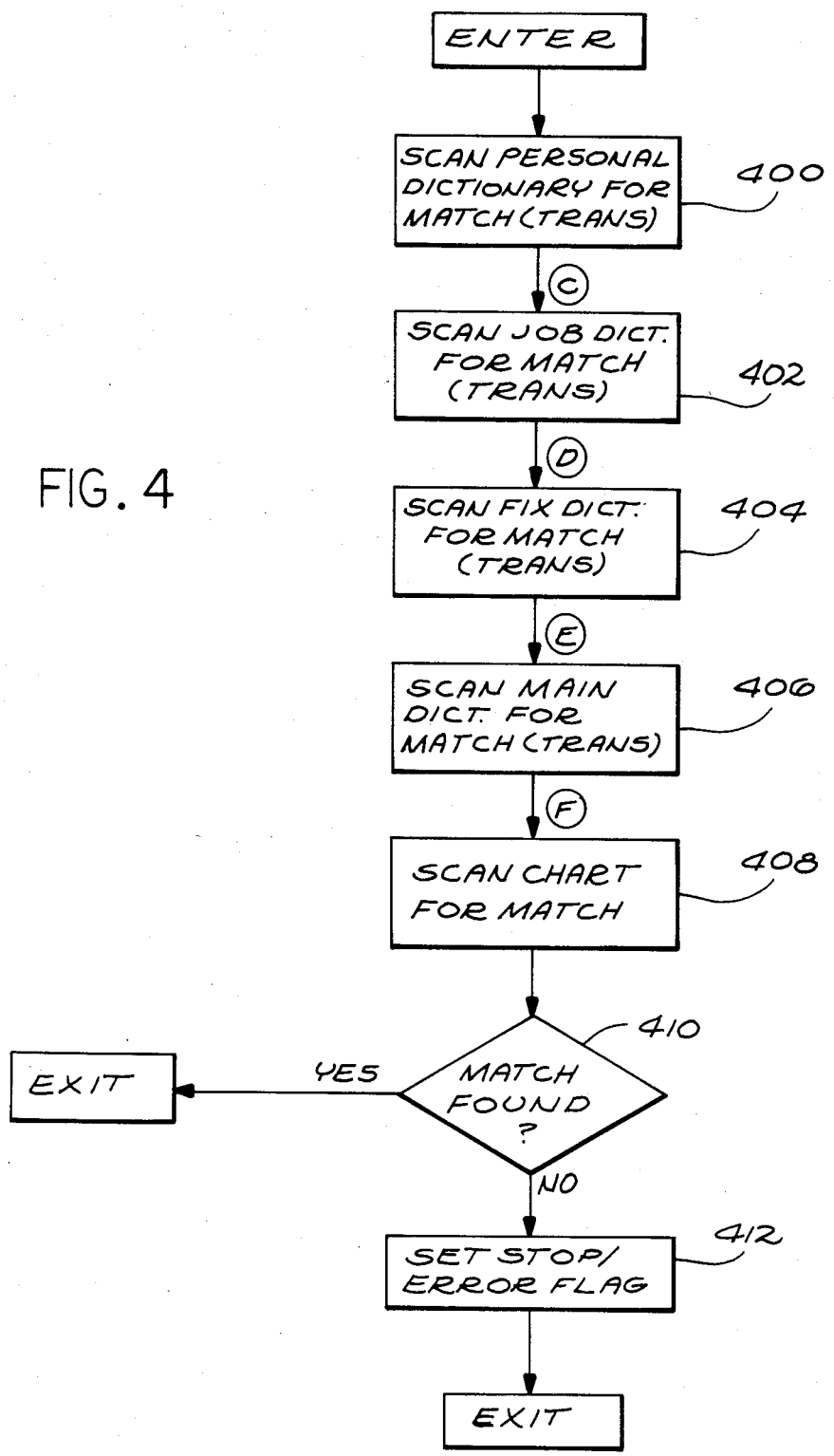
FIG. 4 is a block diagram illustrating the sequence of searching through the exception dictionary memory means and then through the scan chart memory of the translator in accordance with an illustrative embodiment of the invention.

Turning to FIG. 4, when the processor indicates translation is to occur, the processor first searches the exception dictionary memory by first scanning the personal dictionary memory (block 400) and if no match is found next searching the job dictionary (block 402), and if no match is found next searching the fix dictionary (404), and if no match is found finally searching the master dictionary (block 406). If a match is not found in any of the personal, job, fix or master dictionaries, the processor looks to the scan chart for a match (block 408). The method of determining whether a match is found in one of the exception dictionary memories will be described hereafter in connection with FIGS. 6A, 6B, 6C and 6D. If a match is found, then translation will proceed in the manner illustrated in FIGS. 5A and 5B. The program then returns to the idle loop 301 (block 410). If no match is found in any of the personal dictionary, job dictionary, fix dictionary master dictionary or in the scan chart, a stop/error flag is set (block 412) which may, at the option of the operator, inhibit further input to the processor until the error has been corrected or the flag reset.

The lexical stroke symbol format in accordance with the invention may be understood with reference to FIG. 6C. In FIG. 6C, the stroke entries stored in the memory for the words "primadonna" and "prioress" are shown. The stroke entry for the word "primadonna" consists of four lexical stroke symbols 706 arranged to define a subsequence representative of the word "primadonna". Similarly, the language part "prioress" is represented by a subsequence of three lexical stroke symbols 708. The first lexical stroke symbol in the stroke entry representing the word "primadonna" includes a left hand portion 710 (to the left of the dash) represented by two consonant characters P and R, and a thumbs/right hand portion 712 (to the right of the dash) consisting of the two vowel characters E and U and two consonant characters, P and L. Consonant characters to the left of the dash in FIGS. 6B, 6C and 6D represent the left hand part of a lexical stroke symbol in that they will always be stroked by the left hand fingers in accordance with the stenographic methodology and stroking format. Vowels will always be stroked with the operator's thumbs and represent a vowel part. Consonant characters to the right of a vowel represent the part of the lexical stroke symbol stroked with the operator's right hand.

Returning to FIG. 6C, the second stroke symbol in the subsequence making up the stroke entry representing the word "primadonna" is A. This stroke symbol consists only of a vowel part. Similarly, in the word "prioress", the last stroke symbol, namely ES, is represented by a thumbs/right hand portion since it includes a vowel and a consonant to the right of the vowel. In summary, the lexical stroke symbol format includes a right hand consonants part, a left hand consonants part and a center vowels part to the right of the left consonants part or to the left of the right consonants part. Each lexical stroke symbol includes one or more of the parts.

In order to translate a lexical stroke symbol, an exception dictionary is generated consisting of a plurality of stroke entries and their associated language parts arranged in a predefined order in the processor memory. Referring to FIG. 6D, a portion of an exception dictionary ordered in accordance with a preferred ordering is illustrated. Each language part, which may be a word root or part, a suffix, a prefix, a punctuation marking or a language symbol such as those listed in column 726, has associated therewith a stroke entry such as the stroke entries in column 728 adjacent the corresponding language part listed in colum 726. Each stroke entry listed in column 728 consists of at least one lexical stroke symbol.

The individual lexical stroke symbols in column 728 are indicated by an initially occurring slash mark. Hence, the word, "principal" has a stroke entry consisting of a subsequence of two lexical stroke symbols—namely PR-EUPBS and PA-L.

Each of the dictionaries in the memory means 178 of FIG. 2, with the possible exception of the scan chart, is arranged in alphabetical order according to the predefined stenographic alphabetic order. An illustrative predefined stenographic alphabetic order is set forth in FIG. 6A. It will be appreciated, of course, that any other ordering of letters and symbols may be incorporated to define a stenographic alphabet. Entries into each memory are initially arranged in alphabetical order according to that stenographic alphabetic order considering only the first lexical stroke symbol of each stroke entry to be listed in the dictionary. Further alphabetic ordering, if necessary, is done considering only the second lexical stroke symbol of the stroke entries. Ordering continues considering in sequence each successive lexical stroke symbol of the stroke entry until all of the stroke entries in the dictionary have been unambiguously ordered.

Referring to the character sequence of FIG. 6A, it will be noted that there are two "s" letters, two "t"s, two "p"s and two "r"s. In accordance with the illustrated ordering methodology, when left consonat characters of the lexical stroke symbol are being considered, ordering is done according to the first occurring letters "s", "t", "p" and "r". The second occurring letters "r", "p", "t" and "s" are therefore ignored. If ordering is being done using the right consonant characters of the stroke symbol, then ordering is done considering the second occurring letters "r", "p", "t" and "s" and the first occurring letters "s", "t", "p" and "r" are ignored.

By way of illustration, FIG. 6D is arranged in accordance with the above defined stenographic alphabetic order. For example, the lexical stroke symbol PR-EUPBG appears before the lexical stroke symbol PR-EUPBT because the last character "G" comes before the second occurrence of the character "T" in the stenographic alphabet order of FIG. 6A. The second occurrence of the character "T" is used rather than the first occurrence of the character "T" because the compared characters G and T are in the right hand part of the stroke symbol. Similarly, the stroke symbol PR-EUPBS is ordered after the stroke symbol PR-EUPBT because the second occurrence of the character T occurs before the second occurrence of the character S.

The language parts "prince", "principal", "principle", and "princess" all start with the same stroke symbol PR-EUPBS. These four language parts therefore constitute a first level group 732 requiring further ordering. In a similar manner, the language part "pring" also consists of a different first level group 734 but since it only has one member there is no need for further ordering within the group. Other first level groups which include more than one stroke entry include the group 736 consisting of the language parts "prim" "primitively", "primitive", "perimeter" and "primadonna"; the group 738 consisting of the language parts "prig" and "priggish"; the group 740 consisting of the word "pris", "prisoner", "prisma", "prismoid" and "prism" and the group 742 consisting of the prefix "pri" and the words "private" and "prioress". Each of the first level groups 732, 736, 738, 740 and 742 require further ordering since they are identical when only the first occurring lexical stroke symbol is considered. The stroke entries within each of these first level groups 732, 736, 738, 740 and 742 must therefore be further ordered considering the lexical stroke symbol occurring second.

Referring to the first level group 732, it will first be noted that the word "prince" has only one stroke symbol while the remaining language parts in the first level group 732 each have a second stroke symbol. Hence, a stroke symbol ordering ambiguity exists since there is nothing to indicate whether "prince" should be ordered first or last in the ordering of the exception dictionary memory. In accordance with the illustrated embodiment of the invention, it has been determined to be functionally preferably, when such stroke symbol ambiguities occur, to place the stroke entry with the fewest number of stroke symbols first and then arrange all remaining stroke entries according to the next occurring stroke symbol. Hence, the stroke entry for the word "prince" would occur first.

Considering the predefined stenographic alphabet of FIG. 6A, the stroke entry for "principal" is represented by two stroke symbols the second of which is PA-L. The second stroke symbol in the stroke entry representing the word "principle" the PE-L. Since the initial character P in both are the same, the second occurring characters must be compared. In accordance with the ordering of FIG. 6A, the letter A comes before the letter E. Consequently, the the stroke entry for "principal" is ordered before the stroke entry for the word "principle". The word "princess" is ordered last because the character E comes after the first occurrence of the character P. Again it is noted that the first occurrence of the character P is utilized rather than the second occurrence of the character P because the first stroke symbol for both "principal" and "principle" start with a letter P which is in the left hand portion of the stroke symbol. Again the character E follows the first occurrence of the character P and hence "princess" follows the words "principal" and "principle". Ordering continues in the above manner until all of the stroke entries in each of the first level groups are ordered in a series of second level groups such as, for example, the second level groups 744, 746, 748 and 750.

At this juncture, it is noted that character ordering ambiguities can likewise occur. Reference is specifically made to the words "primitively" and "primitive". The second stroke symbol 203 of the word "primitively" is T-EUFL while the second stroke symbol 805 for the word "primitive" is T-EUF. Hence, the first four characters are identical. When an attempt is made to compare the fifth character in the second stroke symbol of the respective stroke entries for "primitively" and "primitive", a character ordering ambiguity occurs because the second stroke symbol for primitive has only four characters. It has been determined that more efficient searching and translation occurs if character ambiguities are resolved by ordering the stroke entry with the stroke symbol (used to effect ordering) having the greatest number of characters, first. Consequently, the stroke entry 804 for "primitively" is ordered before the stroke entry 806 for "primitive".

Referring to FIG. 6B, a series of stroke symbols each separated by a slash mark are illustrated. This series of stroke symbols 760 is typical of a series which would be received by the translator 130 from a steno stroke symbol generator 110 or other similar steno stroke device such as a tape recorder 152 or the like. This series of stroke symbols starts with a control stroke symbol *RBGS (762) which will be predefined as such and sensed by the processor 158. The processor 158 will thereupon initiate certain actions or processes in accordance with a control function predefined in the software. The remaining stroke symbols are all representative of language parts and hence are lexical stroke symbols. The sequence 764 of lexical stroke symbols occurs in the order in which the operator generates them. Therefore, the first lexical stroke symbol 766 in the sequence of lexical stroke symbols 764 is PR-EUPL, the second lexical stroke symbol 768 is T-EUF and so forth for each following lexical stroke symbol 770, 772, 774, 776, 778, 780 and 782.

Figure 5A:
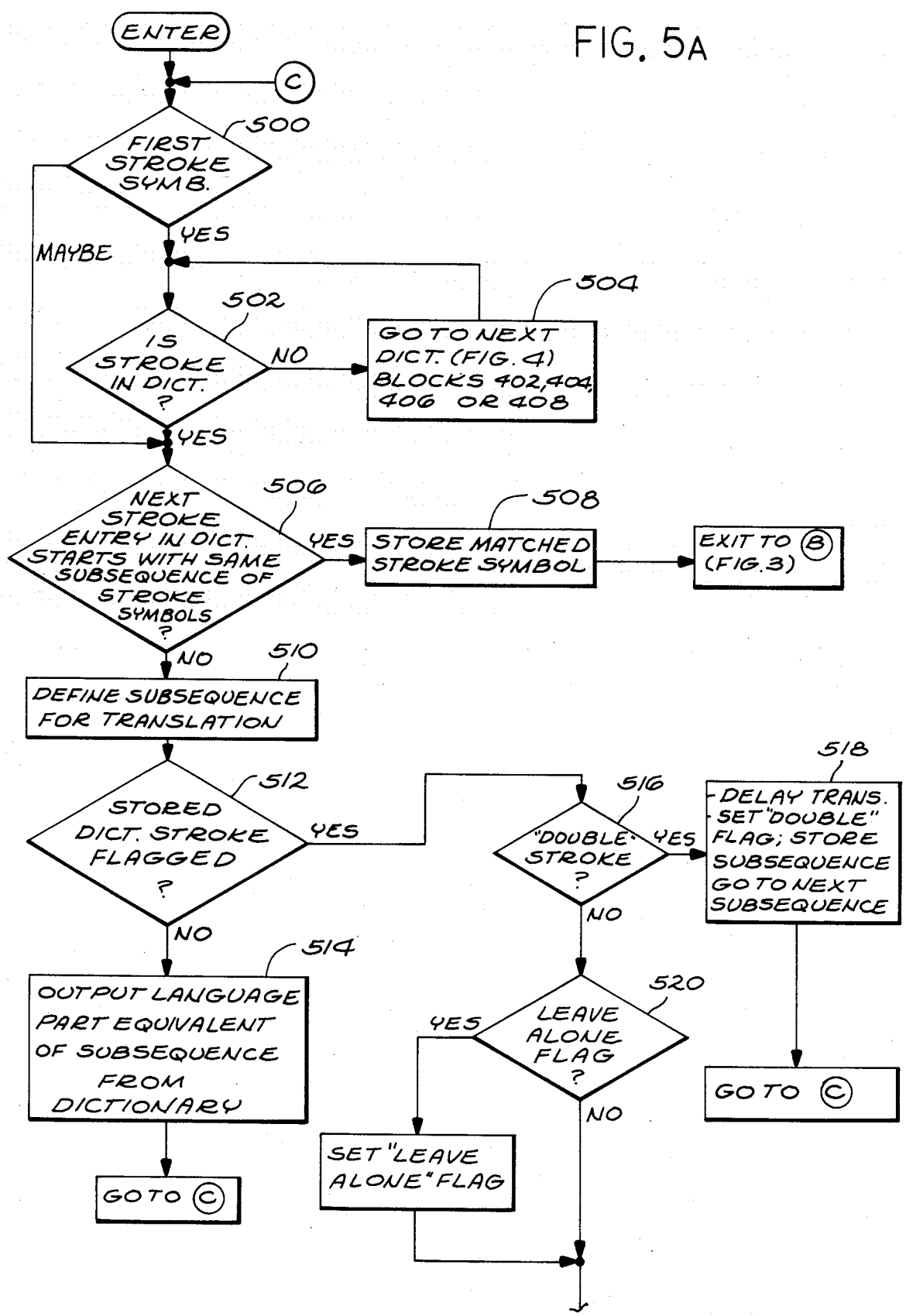
FIGS. 5A and 5B illustrate one method of translation in accordance with the invention.

In order to translate the sequence of lexical stroke symbols 764 in FIG. 6B, the translator 130 is programmed to identify subsequences corresponding to stroke entries in the memory means 178 and then to combine the resultant language part translations according to predefined rule sets to form complete words, phrases and sentences. One method by which this can be done is illustrated in the flow chart of FIGS. 5A and 5B. Referring to FIG. 5A in conjunction with FIG. 6B, when a stroke symbol is determined to be a lexical stroke symbol such as the stroke symbol 766 (FIG. 6B), it enters the translation routine of the processor. The processor first determines whether the stroke symbol 766 is the first stroke symbol of a subsequence (block 500) where a subsequence of stroke symbols is defined in accordance with the present application as being a sequence of one or more lexical stroke symbols having a language part translation in the exception memory 179. This may be determined in one of two ways: First, if the stroke symbol is the first occurring stroke symbol of the entire sequence of lexical stroke symbols, such as the sequence 764, then it must necessarily be the first stroke symbol in a subsequence of consecutive stroke symbols formed from the sequence 764. Secondly, the first stroke symbol which occurs after a complete word has been translated will also be the first stroke symbol of the next subsequence.

If the stroke symbol is the first of a subsequence then blocks 502 and 504 determine whether the stroke is in one of the exception dictionary memories such as the fix dictionary, the personal dictionary, the job dictionary or the master dictionary (block 500). This is accomplished by comparing the stroke symbol against the first occurring stroke symbol of each stroke entry stored in the exception dictionary memory in question. Using the FIG. 6B sequence as an illustration, if a match cannot be found in the personal dictionary, the job dictionary or the fix dictionary for the stroke entry PR-EUPL, the processor would search in sequence, the entries in the master dictionary, the relevant portion of which is shown on FIG. 6D. The stroke symbol PR-EUPL would therefore be compared against the first stroke symbol in each stroke entry with each comparison being made sequentially through the list 728 (block 506) until stroke entry 802 was reached. The result of a comparison between the stroke symbol 766 and the first stroke symbol of the stroke entry 802 would result in a positive match. The processor would then look at the next dictionary entry, namely entry 804 to determine if the first occurring stroke symbol in the next stroke entry is the same as the stroke symbol 766 (block 506). If, as in the present case, the test was positive, the processor would store the stroke symbol 766 in a suitable buffer where the contents of the buffer would define a preliminary subsequence (block 508). The processor would then return to the idle loop of FIG. 3 and await for the next stroke symbol in the sequence 764.

When the next stroke symbol is received, the translation program will again be entered. However, the processor, in block 508, would have set a flag or provide some other indication that there was a preliminary subsequence stored in a buffer. Consequently, when the processor reaches the decision block 500, the answer would be "maybe" whereupon the processor would immediately go to the next stroke entry following the entry in the dictionary memory at which a match previously occurred. For example, when the stroke symbol 768 was tested in block 500, the processor would immediately go to stroke entry 804, the entry following entry 802 which was the first entry which compared positively with the stroke symbol 766. The stroke symbol 768 being the second stroke symbol in a preliminary definition of a subsequence would then be compared against the second occurring stroke symbol 803 of the stroke entry 804. A comparison of the stroke symbol 768 with the stroke symbol 803 would be negative. A comparison would then be made with the stroke symbol 805 in the stroke entry 806. This comparison would be positive since the stroke symbol 768 would compare with the stroke symbol 805. The response in block 506 would thus be in the affirmative and the stroke symbol 768 would be stored next to the stroke symbol 766 to define a new modified, preliminary subsequence of stroke symbols (block 508). A like comparison would then be done with the third occurring stroke symbol, namely stroke symbol 770. However, because of the order of storage in the memory shown in FIG. 6D it can be stated without doubt that if the next following stroke entry consists of a fewer number of stroke symbols than the number of stroke symbols in the modified preliminary subsequence stored in the buffer, then the contents of the buffer containing the preliminary subsequence would define a subsequence for translation and the most recently received stroke symbol could be defined as the first stroke symbol of the next subsequence.

By way of illustration, when the stroke symbol 770 is applied to block 500, the response would again be "maybe". When stroke symbol 770 is compared against the next following stroke entry in the memory, namely stroke entry 808, the processor in block 506 would indicate that the total number of stroke symbols in the stroke entry 808 is only two whereas the stroke symbol 770 is the third one to occur since the stroke symbol 776 occurred. This will automatically trigger a negative response in block 506 with the preliminary subsequence defined previously in block 508 (subsequence 784 in FIG. 6B) being defined as a subsequence which is ripe for translation (block 510). Stroke symbol 770 is then defined as the first occurring stroke symbol of the next subsequence 786. The subsequence 784 is then tested in block 512 to determine if a flag, such as the prefix flag 730 in FIG. 6D, is present (block 512). If a flag is not present, then the language part equivalent of the subsequence is outputted from the dictionary to a word buffer (block 514). The program would then reenter the translation routine to again test the stroke symbol 770 to determine if that stroke symbol was the first stroke symbol of the next subsequence (block 500). The test would be positive and the above process repeated until subsequence 786 was defined.

According to the above method, the first subsequence will be translated as the word "primitive". The next subsequence 786 will similarly be translated as the word "perimeter". The third subsequence 788 will be translated "primadonna". The fourth subsequence 790, assuming no stroke symbols are received thereafter, will be translated as the word "prince". If a stroke symbol occurs after the stroke 782, however, similar testing will be required to determine whether the next following stroke symbol is either PA-L, P-EL or -ES. An appropriate translation will be made if the result is positive. On the other hand, if no comparison occurs with the next occurring stroke symbol after stroke symbol 782, then the translation will remain "prince".

If the subsequence tested in block 512 is flagged then the processor determines what the flag is. For example, if the flag is a "double" flag (block 516) then the processor does not permit translation. Rather, the subsequence is stored in a stroke buffer to await the next occurring subsequence. If the next occuring subsequence is a suffix with a double flag also set, then the last letter of the untranslated subsequence is doubled and the suffix added to the translation of the subsequence stored in the buffer. If the next stroke symbol is not a suffix then translation of the subsequence in the buffer will occur (block 518).

Of course, various other methods of doubling the last letter when a suffix is added could be integrated without departing from the invention. Block 520 tests to determine whether a "leave alone" flag is set. If it is, then the translation of the subsequence is left alone and no other modifications to the word occur when a suffix is attached (block 522).

Figure 5B:
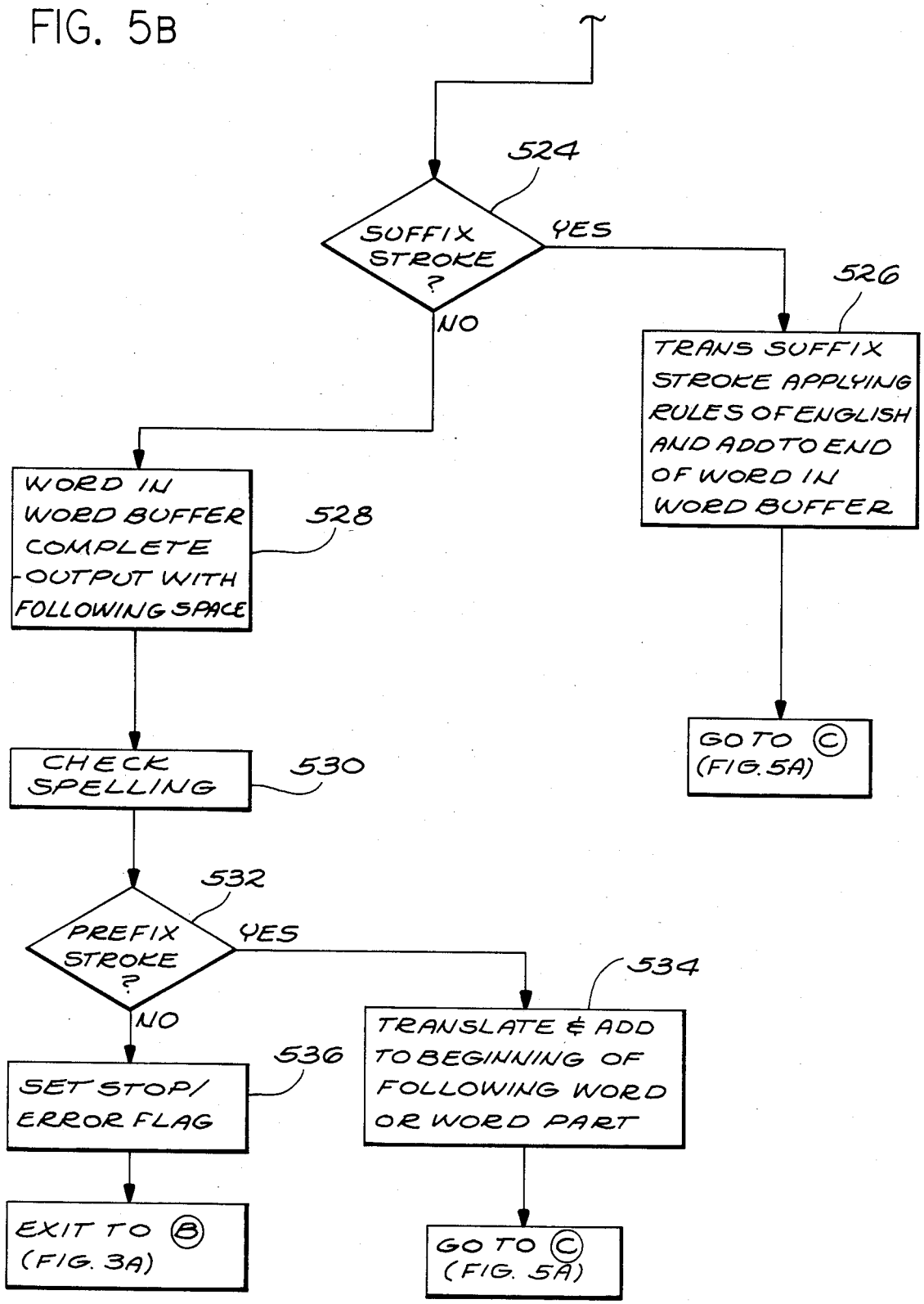

Referring to FIG. 5B, the next test is whether the flag is a suffix (block 524). If the flag indicates that the subsequence is a suffix, then the subsequence is translated and the translation is applied to the prior subsequence applying preprogammed rules of English such as changing a "y" to an "i" and adding "es" and the like (block 526). These rules of English are easily defined and programmed so that a translated suffix may be added to a prior subsequence defining a language part. If there is no suffix flag, then the processor knows that the word is complete and translation occurs and the output of the language part corresponding to the subsequence is accomplished in block 528. The translated word may then be checked for spelling as desired in block 530. If the subsequence has a prefix flag (block 532) the processor adds the prefix language part to the beginning of the next following subsequence translated (block 534). If in response to a test to determine whether the prefix flag has been set responds negative, then an error has occurred and the error flag is set (block 536).

As illustrated in FIGS. 5A and 5B, the translation routine is reentered after each subsequence is defined to enable the most recently received stroke symbol to be defined as a first occurring stroke symbol of the next subsequence. It will also be appreciated that the method of FIGS. 5A and 5B are presented merely to illustrate the general methodology of searching the exception dictionary for matches and many alterations, variations and different embodiments are possible.

This process is modified if translation occurs in response to application of a predefined identifier rule set as previously described and a scan chart is included. The scan chart is preferably arranged as a left sublist, vowel sublist and vowel/right sublist corresponding to the left consonant center-vowel and center-vowel/right consonant parts of each stroke symbol. Further, the adopted methodology requires an asterisk to be stroked in certain cases to enable the processor to unambiguously distinguish prefix, suffix and word root lexical stroke symbols, provided those strokes are not otherwise translatable from the exeption dictionary memory. Stroking of other keys also enables the processor, for example, to double last occurring consonants and appropriately change a "y" on a y-ending word to an "i" before adding a suffix. One specific embodiment of the invention which analyzes each stroke symbol analyzed and its associated flags is illustrated by the following simplified-steps:

1. Initially set up a translation generation buffer in which a translation of lexical stroke sybols will be generated from analysis and translation of the left consonant, vowel and right consonant parts of the lexical stroke symbol based on the set of rules set forth below (these rules have significance only if the lexical stroke symbol in not already in the exception dictionary).

2. If a lexical stroke symbol is in the execption dictionary, translate it as above described and go to step 100. All processing with reference to the scan chart applies to single lexical stroke symbols (it is not necessary to look at a subsequence of more than one lexical stroke symbol).

3. If the lexical stroke symbol has a # character, remove the # character and set "endflag".

4. If the lexical stroke symbol has a * character, remove * character and set "startflag" and look for the lexical stroke symbol in the exception dictionary. If found in the exception dictionary, translate it, mark it as a prefix and go to step 100.

5. Compare left hand part of lexical stroke symbol, if there is one, with left hand sublist in Table II. If there is a match, transfer the stored language part translation to a first location in the translation generation buffer and set "leftflag".

6. Compare the center-vowel/right consonant part combination with the "Thumbs/Right Hand" sublist of Table II.
   a. If there is a match
      i. transfer the stored language part translation to a second location in the translation generation buffer and set "cntrrghtflag",
      ii. if the vowel is a short vowel, set "starflag", and
      iii. go to step 9.
   b. If there is no match and there are right hand consonants, flag untranslatable (untran) and go to step 100.

7. Compare vowel part with vowel sublist in Table II. If there is a match, transfer the stored language part translation to the second location in the translation generation buffer.
   a. if the vowel is a short vowel, set "shortflag".
   b. if vowel is a y-ending vowel, set "yendflag".

8. If nothing stored in buffer yet, flag "untran" and go to step 100.

9. If "endflag" set, then:
   a. double last letter of translation in buffer,
   b. if "shortflag" set and "cntrrghtflag" set, then go to step 100.

10. If "yendflag" set and "leftflag" set and "cntrrghtflag" not set, then:
   a. set a leave alone bit meaning the y-ending of the word translation is not changed when a suffix is added.
   b. if "starflag" is not set then go to step 100.

11. If "starflag" not set and "leftflag" not set and "shortflag" set and "cntrrghtflag" set, then:
   a. set "suffix" bit,
   b. go to step 100.

12. If "starflag" is not set and "cntrrght" flag set, then set "prefix" bit and go to step 100

13. If "starflag" set and "shortflag" not set, then set "prefix" bit and go to step 100.

14. If "leftflag" not set and "shortflag" is not set, then set "prefix" bit and go to step 100.

15. If "starflag" is not set and "shortflag" is set and "cntrrghtflag" is not set, then set "prefix" bit and go to step 100.

100. Return to main program and wait for next stroke symbol.

| Summary of prefix and suffix flag assignment procedures: | | | | | | | | |
|---|---|---|---|---|---|---|---|---|
| Starflag | | Leftflag | | Shrtflag | | Cntrghtflag | | I.D. Example |
| not | set | not | set | not | set | not | set | invalid |
| not | set | not | set | not | set |  | set | prefix--AEUPBG-ang |
| not | set | not | set |  | set | not | set | invalid |
| not | set | not | set |  | set |  | set | suffix--ALD----ald |
| not | set |  | set | not | set | not | set | word----PWAOE--bee |
| not | set |  | set | not | set |  | set | word----TAEUR--tear |
| not | set |  | set |  | set | not | set | prefix--TE-----te |
| not | set |  | set |  | set |  | set | word----TAR----tar |
|  | set | not | set | not | set | not | set | invalid |
|  | set | not | set | not | set |  | set | prefix- A*EUPBG-ang |
|  | set | not | set |  | set | not | set | invalid |
|  | set | not | set |  | set |  | set | prefix--*AL----al |
|  | set |  | set | not | set | not | set | invalid |
|  | set |  | set | not | set |  | set | prefix--TOE*R--tore |
|  | set |  | set |  | set | not | set | word----TA*----ta |
|  | set |  | set |  | set |  | set | prefix--TA*R---tar |

To illustrate, the word "pring" is translatable from the scan chart and is stroked as PR=EUPBG. There is no asterisk so "starflag" is not set. PR is a left consonant part so the "leftflag" is set. EU s a short vowel (see Table I) os the "shrtflag" is set. EUPBG has both a center vowel part and a right consonant part. Hence, the "cntrrghtflag" is set. Applying the above chart, the stroke symbol I.D. is "word". Thus, "pring" is a word rather than a prefix or a suffix. Examples of each valid condition are given above.

It will of course be appreciated that exceptions to the above rules will be incorporated in the exception dictionary. Since stroke symbols found in the exception dictionary are translated first, access to the scan chart and the above method of using the scan chart will never occur for that stroke symbol.

The entries in the scan chart memory may be arranged in the same manner as the other memories as illustrated in FIG. 6D with processing occurring in accordance with the general teaching illustrated by FIGS. 5A and 5B. However, because the scan chart will necessarily contain a limited number of entries, simple aliphabetic ordering could be used.

The advantages of the present invention over prior art systems include a very significant decrease in memory requirements for the system and an increase in stroking flexibility whereby many more stroking combinations can be used by the operator to obtain the same correct word translation. The system also enables transcription and translation in foreign languages without the necessity of modifying the system. The decreased memory requirements also translate into lower price and more compact sizes for the system.

To illustrate the dramatic decrease in the size of dictionary memory requirements of conventional systems when compared to the present invention, the following Chart A illustrates the words and corresponding strokes which would have to be stored to translate the following words: discriminate, discriminates, back, ground, background, habitation, humility, prince, principl, principles, Boston, tedious, knot, not, knott, enthusiast, enthusiastically, teem, teems, flap, flapped, chime, chimed, chiming, chimes, se habla Espanol, qui, je parle espanol une petite.

CHART A

Definitions Necessary in a Standard Translation Dictionary:

discriminate /TK-EUS/KR-EUPL/TPHA-EUT
discriminate /TK-EUS/KRAO-EUPL/TPHA-EUT discriminated /TK-EUS/KR-EUPL/TPHA-EUTD discriminated /TK-EUS/KRAO-EUPL/TPHA-EUTD
discriminate /TK*-EUS/KR-EUPL/TPHA-EUT
discriminates /TK*-EUS/KR-EUPL/TPHA-EUTS
discriminates /TK*-EUS/KRAO-EUPL/TPHA-EUTS
discriminate /TK*-EUS/KRAO-EUPL/TPHA-EUT
discriminate /TK-EUS/KR-EUPL/-EUPB/A-ET
discriminates /TK-EUS/KR-EUPL/-EUPB/A-ETS
dicriminated /TK-EUS/KR-EUPL/-EUPB/A-ETD
discriminate /TK*-EUS/KRAO-EUPL/-EUPB/A-ET
discriminates /TK*-EUS/KRAO-EUPL/-EUPB-/A-ETS
discriminated /TK*-EUS/KRAO-EUPL/-EUPB-/A-ETD
discriminate /TK-EUS/KRAO-EUPL/-EUPB/A-ET
discriminates /TK-EUS/KRAO-EUPL/-EUPB/A-ETS
discriminated /TK-EUS/KRAO-EUPL/-EUPB/A-ETD
discriminate /TK-EUS/KR-EU/PH-EUPB/A-ET
discriminate /TK-EUS/KR-EUPL/-EUPB/A-ET
discriminates /TK-EUS/KR-EUPL/-EUPB/A-ET/-ES
discriminated /TK-EUS/KR-EU/PH-EUPB/A-ETD
discriminates /TK-EUS/KR-EU/PH-EUPB/A-ETS
discriminate /TK-EUS/KR-EU/PHAO-EUPB/A-ET
discriminate /TK*-EUS/KR-EU/PH-EUPB/A-ET
discriminate /TK*-EUS/KR-EU/PHAO-EUPB/A-ET
discriminates /TK*-EUS/KR-EU/PH-EUPB/A-ETS
discriminates /TK-EUS/KR-EU/PHAO-EUPB/A-ETS
discriminates /TK*-EUS/KR-EU/PH-EU/TPHA-EUT
discriminates /TK*-EUS/KR-EU/PH-EU/TPHA-EUTS
discriminates /TK*-EUS/KR-EUPL/AO-EUPB/A-ET
discriminates /TK-EUS/KR-EUPL/AO-EUPB/A-ET
discriminate /TK-EUS/KRAO-EUPL/AO-EUPB-/A-ET
discriminate /TK*-EUS/KRAO-EUPL/AO-EUPB-/A-ET
discriminates /TK-EUS/KR-EUPL/AO-EUPB-/A*-T/-ES
discriminates /TK*-EUS/KRAO-EUPL/AO-EUPB/A*-T/-ES
discriminates /TK*-EUS/KR-EUPL/AO-EUPB-/A*-T/-ES
discriminate /STKR-EUPL/TPHA-EUT
discriminates /STKR-EUPL/TPHA-EUTS
discriminated /STKR-EUPL/TPHA-EUTD
discriminates /TK*-EUS/KR-EU/PH-EU/TPHA-T/-ES
discriminate /TK-EUS/KR-EU/PH-EU/TPHA-EUT
discriminates /TK-EUS/KR-EU/PH-EU/TPHA-EUTS
discriminate /TK*-EUS/KR-EU/PH-EU/TPHA-EUT
discriminates /TK*-EUS/KR-EU/PH-EU/TPHA-EUTS
discriminate /TK-EU/SKR-EU/PH-EUPB/A-ET
discriminates /TK-EU/SKR-EU/PH-EUPB/A-ETS
discriminate /TK-EU/SKR-EU/PHAO-EUPB/A-ET
discriminates /TK-EU/SKR-EU/PHAO-EUPB/A-ETS
discriminate /TK-EU/SKR-EU/PH-EU/TPHA-EUT
discriminates /TK-EU/SKR-EU/PH-EU/TPHA-EUTS
discriminates /TK*-EUS/KR-EU/PH-EU/TPHA-/T-ES
discriminates /TK-EU/SKR-EU/PH-EU/TPHA-/T-ES
back /PWABG
ground /TKPWROUPBD
background /PWA*-BG/TKPWRO-UPBD
habilitation /HA-/PW-EUL/TA-EUGZ
habilitation /HA-/PW-EUL/-EUT/A-EUGZ
habilitation /HA-B/-EUL/-EUT/A-EUGZ
habilitation /HA-B/-EUL/TA-EUGZ
habilitation /HA-/PWAO-EUL/TA-EUGZ
habilitation /HA-/PWAO-EUL/-EUT/A-EUGZ
habilitation /HA-/PWAO-EUL/-EUT/A-ET/KWRO-PB
habilitation /HA-/PW-EU/HR-EU/TA-EUGZ
habilitation /HA-/PW-EU/HR-EUT/A-EUGZ
habilitation /HA-/PW-EU/HR-EUT/A-ET/KWRO-PB
habilitation /HA-/PW-EUL/AO-EUT/A-EUGZ
habilitation /HA-B/-EUL/AO-EUT/A-EUGZ
humility /HAO-UPL/-EUL/*-EUT
humility /H-U/PH-EUL/*-EUT
humility /H-U/PHAO-EUL/*-EUT
humility /H-U/PH-EU/HR-EUT/-E
prince /PREUPBS
principle /PREUPBS/PEL
principles /PR-EUPBS/P-ELZ
principles /PR-EUPBS/P-EL/-S
principles /PR-EUPBS/P-EL/-Z
principles /PR-EUPBS/-EUP/-ELZ
principles /PR-EUPBS/-EUP/-EL/-S
principles /PR-EUPBS/-EUP/-EL/-Z
Boston /K-P/PWO-/STO-PB
Boston /K-P/PWO-FT/O-PB
Boston /PWO-FT/O-PB
tedious /T-ED/KWRO-US
tedious /TAO-ED/KWRO-US
tedious /T-E/TK-EU/O-US
tedious /T-E/TK-EU/O-E/*-US
knot /TPHO*-T
knott /#TPHO-T
not /TPHO-T
enthusiast /*EPB/THAOUZ/KWRAFT
enthusiastically /*-EPB/TH-US/KWRA-FT/-EUBG/A-L/HRAO-E
enthusiastically /*-EPB/TH-US/KWRA-FT/-EUBG/A-L/HRAO-E
enthusiastically /*-EPB/TH-U/S-EU/A-FT/-EUBG/A-L/HRAO-E enthusiastically /*-EPB/THAO-UZ/KWRA-FT/-EUBG/A-L/HRAO-E
enthusiastically /*-EPB/THAO-UZ/KWRA-FT/KA-EL
teem /TAOEPL
teems /TAO-EPLZ
teems /TAO-EPL/-S
teems /TAO-EPL/-Z
teems /T-E/-EPLZ
teems /T-E/-EPL/-S
teems /T-E/-EPL/-Z
se /S*E
habla /HA/PWHRA*
espanol /*ES/PAPB/OL
parle /PARL/AOERBGS
qui /KWEU
je /SKWR*E
une /AOUPB/AOERBGS
petite /PET/AOEUT
flap /TPHRAP
flapped /TPHRA-PD
flapped /TPHRA-P/-D
flapped /TPHRA*-P/P-ED
chime /KHAOEUPL
chimed /KHAO-EUPLD
chimed /KHAO-EUPL/-D
chimed /KH-EUPL/-D
chiming /KHAO-EUPLG
chiming /KHAO-EUPL/-G
chiming /KH-EU/PH-EUPBG
chiming /KH-EUPL/-G
chimes /KHAO-EUPLZ
chimes /KHAO-EUPL/-S
chimes /KHAO-EUPL/-Z
chimes /KH-EU/PH-ES
chimes /KH-EUPL/-ES To enable someone to stroke the words and sentences listed in Chart A using the scan chart and the above described methodology, the exception dictionary of the present invention would contain only the following Chart B definitions:

CHART B

Entries for Exception Dictionary

>/ dis /TKEUS (prefix)
</ &~e inate /TPHAEUT (suffix)
habil /HA/PWEUL
</ itation /TAEUGZ (suffix)
humil /HU/PHEUL
</ &~z iple /PEL (suffix)
Boston /PWOFT/OPB
tede /TAOED
knot /TPHO*T
knott /#TPHOT
</ ically /KAEL (suffix)

Of course, the words and corresponding strokes in Chart A by no means cover every way by which a word could be stroked. However, for each new way a word could be stroked, additional entries would be required in the standard translation dictionary illustrated in Chart A. By contrast, many other ways of stroking a word could be stroked by the operator without the necessity of adding to the dictionary of the invention. Hence, in addition to decreased memory size and increased speed, the present invention provides a substantial increase in flexibility, within certain predefined fundamental rules of the system, and the present system would translate such strokes or sequences of strokes correctly.

It will further be appreciated that numerous other embodiments, variations and alterations in the present invention can be made without departing from the spirit and scope of the invention as herein described and illustrated. Consequently, it is the objective of the following claims to encompass all such modifications and variations as fall within the true scope of the invention whether or not such variations or modifications have been specifically described in conjunction with the above illustrative embodiments.

What is claimed is:

1. A steno translator system for translating lexical stroke symbols into language format in accordance with a predefined stenographic methodology, each lexical stroke symbol defined by at least one character from a character set comprising consonants and vowels, the system comprising:

stroke symbol means for providing a sequence of lexical stroke symbols, each lexical stroke symbol defined by at least one of a left consonant part comprising at least one consonant character, a vowel part comprising at least one vowel character, and a right consonant part comprising at least one consonant character;

processor means coupled for receiving the lexical stroke symbols from the stroke symbol means, comprising:

a scan chart memory for storing a selected list of chart entries, the list comprising a left consonant sublist, a vowel sublist and a vowel/right consonant sublist, each chart entry having stored in association therewith a language part defining a translation of the chart entry; and translator means comprising comparing means for comparing the left consonant part of selected lexical stroke symbols having a left consonant part against the left consonant sublist to find a match, the language part associated with the matched member of the left consonant sublist defining a a left consonant translation, comparing the vowel part of selected lexical stroke symbols having a vowel part but no right consonant part against the vowel sublist to find a match, the language part associated with the matched member of the vowel sublist defining a vowel translation, and comparing the combined vowel part and right consonant part of selected lexical stroke symbols having a right consonant part against the vowel/right consonant list to find a match, the language part associated with the matched member of the vowel/right consonant sublist defining a vowel/right consonant translation; and means for combining the left consonant, vowel and vowel/right consonant translations to define a stroke symbol translation from the scan chart memory; and means for combining the stroke symbol translations of the lexical stroke symbols according to a predefined identifier rule set to define complete words in the language format.

2. A steno translator system for translation of lexical stroke symbols to language format in accordance with a predefined stenographic methodology comprising:

stroke symbol means for providing a sequence of lexical stroke symbols;

processor means coupled for receiving the lexical stroke symbols from the stroke symbol means comprising:
  a scan chart memory for storing a selected list of chart entries, each chart entry having stored in association therewith a language part defining a translation of the chart entry, the chart entries in the scan chart memory being selected as those whose translation is a literal translation according to a predefined reference chart, the stored language part for each chart entry in the scan chart memory defining the literal translation of the stroke entry according to the reference chart,
  comparing means for applying each lexical stroke symbol to the scan chart memory to find a match between the lexical stroke symbol and a combination of one or more chart entries, and means for combining the translations of the chart entries combined to match the stroke symbol to define a stroke symbol translation; and
means for combining the stroke symbol translations of the lexical stroke symbols according to a predefined identifier rule set to define complete words in the language format.

3. A steno translator system for translation of lexical stroke symbols to language format in accordance with a predefined stenographic methodology, the lexical stroke symbols defined by at least one character from a character set comprising consonants and vowels, the system comprising:
  stroke symbol means for providing a sequence of lexical stroke symbols, each lexical stroke symbol defined by at least one of a plurality of subparts in accordance with predefined grouping criteria, each subpart having an identified grouping criterion associated therewith;
  processor means coupled for receiving the lexical stroke symbols from the stroke symbol means, comprising:
    a scan chart memory for storing a selected list of chart entires, the list comprising a plurality of sublists, the chart entries in each sublist selected to conform to one of the grouping criteria, each chart entry having stored in association therewith a language part defining a translation of the chart entry,
    translation means comprising comparing means for comparing each subpart of a lexical stroke symbol against the sublist having the conforming grouping criterion associated therewith to find a match, the language part associated with the matched member of the sublist defining the translation for that subpart of the lexical stroke symbol, and means for combining the translation of all the subparts of a lexical stroke symbol to define a stroke symbol translation; and
  means for combining the stroke symbol translations of the lexical stroke symbols according to a predefined identifier rule set.

4. The steno translator system of claim 1 or 2 or 3 wherein the processor means further comprises:
  an exception dictionary memory for storing a list of dictionary entries, each dictionary entry comprising a subsequence of at least one lexical stroke symbol and an associated language part defining a translation of the subsequence for each dictionary entry; and
  searching means for comparing selected subsequences of lexical stroke symbols from the stroke symbol means, according to a predefined searching methodology, first against dictionary entries to identify a match, said match defined as a subsequence translation, and if no match is located in the exception dictionary memory next applying individual lexical stroke symbols to the scan chart memory to define a stroke symbol translation.

5. The steno translator system of claim 1 or 2 or 3 further comprising:
  means for defining each stroke symbol translation, derived from the scan chart memory as a suffix, prefix or word root by applying the predefined identifier rule set to the lexical stroke symbol.

6. The steno translator system of claim 5 wherein the means for combining comprises:
  means for combining a stroke symbol translation defined as a suffix with the stroke symbol translation of the immediately preceding stroke symbol translation in accordance with a first predefined language rule set; and
  means for combining each stroke symbol translation next succeeding a lexical stroke symbol in accordance with a second predefined language rule set.

7. The steno translator system of claim 1 wherein the stroke symbol means comprises:
  a steno keyboard having a plurality of keys for generating the lexical stroke symbols in response to manual depression of the keys;
  a printer coupled to the steno keyboard for printing a written representation of each generated lexical stroke symbol;
  a visual display coupled to the steno keyboard for displaying a visual prepresentation of each generated lexical stroke symbol; and
  storage means coupled to the steno keyboard for receiving and storing the lexical stroke symbols generated by the steno keyboard.

8. The steno translator system of claim 4 wherein the exception dictionary memory comprises:
  a personal dictionary memory;
  a job dictionary memory;
  a fix dictionary memory;
  and a master dictionary memory, the hierarchy of searching through the exception dictionary memory by the translator means being first the personal dictionary memory, next the job dictionary memory, next the fix dictionary memory and next the master dictionary memory.

9. The steno translator system of claim 1 wherein the stroke symbol means comprises a recording means for storing the lexical stroke symbols in the order generated and selectively outputting the lexical stroke symbols in accordance with said order.

10. The steno translator system of claim 1 wherein the stroke symbol means comprises means for generating a series of stroke symbols, the series including the sequence of lexical stroke symbols, each being from a defined set of lexical stroke symbols, and at least one control stroke symbol, each from a defined set of control stroke symbols, different from the set of lexical stroke symbols, defining an instruction set for controlling operation of the steno translator system; and
  the processor means further comprises means for identifying the stroke symbols as either lexical stroke symbols or control stroke symbols and applying the control stroke symbols for controlling operation of the translator system.

11. The steno translator system of claim 10 further comprising utilization means coupled to the processor means to receive and utilize the translated language parts, the processor means further coupled for controlling the operation of the utilization means in response to the application of control stroke symbols from the stroke symbol means.

12. The steno translator system of claim 11 wherein the utilization means is a word processor.

13. The steno translator system of claim 11 wherein the utilization means is a voice synthesizer.

14. The steno translator system of claim 1 wherein the means for comparing comprises means for comparing the left consonant part against the left consonant sublist first, comparing the vowel/right consonant part against the vowel/right consonant list next, and comparing the vowel against the vowel sublist last and then only if there is no right consonant part of the lexical stroke symbol.

15. The steno translator system of claim 1 wherein the character set further comprises a flag symbol and wherein the vowel sublist includes a sublist of short vowels and wherein the means for combining the stroke symbol translation comprises:
   means for associating a first flag with the stroke symbol translation of each lexical stroke symbol which includes a flag symbol character;
   means for associating a second flag with the stroke symbol translation of each lexical stroke symbol having a left consonant part;
   means for associating a third flag with the stroke symbol translation of each lexical stroke symbol having a vowel part which is a short vowel;
   means for associating a fourth flag with the stroke symbol translation of each lexical stroke symbol having both a vowel part and a right consonant part; and
   means for defining the stroke symbol translation as a suffix, prefix or word root in response to the associated settings of the first flag, second flag, third flag and fourth flag.

16. The steno translator system of claim 15 wherein the identifier rule set comprises:

| Firstflag | Secondflag | Thirdflag | Fourthflag | I.D. |
|---|---|---|---|---|
| not set | not set | not set | not set | invalid |
| not set | not set | not set | set | prefix |
| not set | not set | set | not set | invalid |
| not set | not set | set | set | suffix |
| not set | set | not set | not set | word |
| not set | set | not set | set | word |
| not set | set | set | not set | prefix |
| not set | set | set | set | word |
| set | not set | not set | not set | invalid |
| set | not set | not set | set | prefix |
| set | not set | set | not set | invalid |
| set | not set | set | set | prefix |
| set | set | not set | not set | invalid |
| set | set | not set | set | prefix |
| set | set | set | not set | word |
| set | set | set | set | prefix |

17. The steno translator system of claim 4 wherein the processor means further comprises:
   means for altering the exception dictionary comprising:
   means for generating a first control stroke symbol different from a lexical stroke symbol, the processor means being responsive to the first control stroke symbol to enable alteration access to the exception dictionary;
   means for entering a selected language part;
   means for generating a second control stroke symbol to define the end of the entered selected language part;
   means for entering a subsequence of at least one lexical stroke symbol defined to correspond to the entered language part;
   means for generating a predefined third control stroke symbol to define completion of the entering of lexical stroke symbols; and
   means for storing the entered language part and the corresponding entered lexical stroke symbols in the exception dictionary means in association with each other.

18. The steno translator system of claim 15 or 16 wherein the character set further comprises a defined double symbol and the defined vowel sublist is further defined to include a sublist of vowels whose translation ends in a "Y" character and wherein the means for defining the stroke symbol translation comprises:
   means for doubling the last letter of the stroke symbol translation when the lexical stroke symbol includes a double symbol; and
   means for selectively altering the stroke symbol translation when the lexical stroke symbol includes a vowel whose translation ends in a "Y" character.

19. A method for translating lexical stroke symbols consisting of at least one character comprising the steps of:
   defining a stenographic stroking format whereby lexical stroke symbols are defined by a plurality of stroke parts, each part having predefined characteristics associated therewith;
   generating a scan chart including a list of stroke parts, each stroke part having associated therewith a language part defining a translation of the stroke part, the format being such as to enable individual lexical stroke symbols, translated by reference to the scan chart, to be categorized as a suffix, a word root or a prefix by reference to the predefined characteristics of the stroke parts of the lexical stroke symbol and by further reference to the presence or absence of a particular stroke part in a lexical stroke symbol, and by application of a predefined stroke part identifier rule set;
   generating a series of lexical stroke symbols according to the predefined stenographic stroking format;
   selecting a set of the generated lexical stroke symbols for application to the contents of the scan chart;
   identifying and combining the language parts of the stroke parts of each lexical stroke symbol in the selected set to define a stroke symbol translation; and
   appling the predefined identifier rule set to each lexical stroke symbol and its parts in the selected set to define the stroke symbol translation as a word root, a suffix or a prefix.

20. The method of claim 19 comprising the further steps of:
   combining each language part identified as a suffix with the immediately preceding language part in accordance with a first predefined language rule set; and combining each language part identified as a prefix with the immediately following language part in accordance with a second predefined language rule set.

21. The method of claim 19 wherein the step of generating the series of lexical stroke symbols comprises the step of manually depressing a steno keyboard in accordance with the predefined stenographic stroking format.

22. The method of claim 19 or 20 further comprising the steps of:
generating a list of stroke subsequences, each subsequence comprising at least one lexical stroke symbol, each subsequence having associated therewith a language part defining a translation of the subsequence;
applying the series of lexical stroke symbols first to the list of subsequences to identify any unique matches between a combination of at least one lexical stroke symbol, the language part associated with the uniquely matched subsequence defining the translation of the combination of lexical stroke symbols;
the step of selecting a set of lexical stroke symbols for application to the contents of the scan chart comprising the step of selecting all lexical stroke symbols for which no match exists in the list of subsequences.

23. The method of claim 22 comprising the further steps of:
segregating the list of stroke subsequences into a fix dictionary, a personal dictionary, a job dictionary, and a master dictionary, and
independently arranging the stroke subsequences in each of the fix, personal, job and master dictionaries in accordance with the predefined stroke subsequence order the step of applying the series of lexical stroke symbols comprising the steps of searching sequentially and in order through the personal dictionary, the job dictionary, the fix dictionary, and the master dictionary to find a match between a stroke subsequence in the dictionary and a generated stroke subsequence.

24. The method of claim 19 further comprising the step of:
manipulating the stroke symbol translation in a utilization means in response to the application of control stroke symbols different from the defined lexical stroke symbols.

25. A method for translating lexical stroke symbols into language format in accordance with a predefined stenographic methodology, each lexical stroke symbol defined by at least one character set comprising consonants and vowels, the method comprising the steps of:
generating a sequence of lexical stroke symbols, each lexical stroke symbol defined by at least one of a left consonant part comprising at least one consonant character, a vowel part comprising at least one vowel character and a right consonant part comprising at least one consonant character;
applying the lexical stroke symbols from the stroke symbol means to a processor comprising the steps of:
storing a selected list of chart entries in a scan chart memory, the list comprising a left consonant sublist, a vowel sublist and a vowel/right consonant sublist, each chart entry having stored in association therewith a language part defining a translation of the chart entry;
comparing the left consonant part of a selected lexical stroke symbol against the left consonant sublist to find a match, the language part associated with the matched member of the left consonant sublist defining a left consonant translation;
comparing the vowel part of the selected lexical stroke symbol, each having a vowel part but no right consonant part against the vowel sublist to find a match, the language part associated with the matched member of the vowel sublist defining a vowel translation;
comparing the combined vowel part and right consonant part of the selected lexical stroke symbol against the vowel/right consonant list to find a match, the language part associated with the matched member of the vowel/right consonant sublist defining a vowel/right consonant translation;
combining the left consonant, vowel and vowel/right consonant translations to define a stroke symbol translation derived from the scan chart memory; and
combining the stroke symbol translations of the lexical stroke symbols according to a predefined identifier rule set to define complete words in the language format.

26. A method for translation of lexical stroke symbols to language format in accordance with a predefined stenographic methodology comprising:
generating a sequence of lexical stroke symbols;
applying the lexical stroke symbols from the stroke symbol means to a processor comprising the steps of:
storing a selected list of chart entries in a scan chart memory, each chart entry having stored in association therewith a language part defining a translation of the chart entry, the chart entries in the scan chart memory being selected as those whose translation is a literal translation according to a predefined reference chart, the stored language part for each chart entry in the scan chart memory defining the literal translation of the stroke entry according to the reference chart;
applying each lexical stroke symbol to the scan chart memory to find a match between the lexical stroke symbol and a combination of at least one chart entry;
combining the translations of the chart entries matching the stroke symbol to define a stroke symbol translation; and
combining the stroke symbol translations of the lexical stroke symbols according to a predefined identifier rule set to define complete words in the language format.

27. A method for translation of lexical stroke symbols to language format in accordance with a predefined stenographic methodology, the lexical stroke symbols defined by at least one character from a character set comprising consonants and vowels, the method comprising:
generating a sequence of lexical stroke symbols, each lexical stroke symbol defined by at least one of a plurality of subparts in accordance with predefined grouping criteria, each subpart having an identified grouping criterion associated therewith;

applying the lexical stroke symbols from the stroke symbol means to a processor means comprising:

storing a selected list of chart entries in a scan chart memory, the list comprising a plurality of sublists, the chart entries in each sublist selected to conform to one group criterion, each chart entry having stored in association therewith a language part defining a translation of the chart entry, comparing means for comparing each subpart of a lexical stroke symbol against the sublist having the grouping criterion conforming to that of the subpart associated therewith to find a match, the language part associated with the matched member of the sublist defining the translation for that subpart of the lexical stroke symbol;

combining the translation of all subparts of a lexical stroke symbol to define a stroke symbol translation, and combining the stroke symbol translations of the lexical stroke symbols according to a predefined identifier rule set to define complete words in the language format.

28. The method of claim 25 further comprising:

storing a list of exception dictionary entries, each exception dictionary entry comprising a subsequence which includes at least one lexical stroke symbol and an associated language part defining a translation of the subsequence of that exception dictionary entry; and comparing subsequences of lexical stroke symbols from the stroke symbol means, first against the dictionary entries to identify a match, said match defined as a subsequence translation, and if no match is located in the exception dictionary memory, next applying individual lexical stroke symbols to the scan chart memory to define stroke symbol translations.

29. The method of claim 25 or 26 or 27 further comprising:

categorizing each stroke symbol translation, derived from the scan chart memory, as a suffix, prefix or word part by applying the predefined identifier rule set to the lexical stroke symbol.

30. The method of claim 29 wherein the step of combining comprises the steps of:

combining each stroke symbol translation defined as a suffix with the stroke symbol translation of the immediately preceding stroke symbol translation in accordance with a first predefined language rule set; and combining each stroke symbol translation of the next succeeding stroke symbol in accordance with a second predefined language rule set.

31. The method of claim 25 further comprising the steps of:

generating a series of stroke symbols including the step of generating the sequence of lexical stroke symbols, from a set of lexical stroke symbols, and the step of generating at least one control stroke symbol, from a defined set of control stroke symbols, the control stroke symbols being different from the set of lexical stroke symbols, the control stroke symbols defining an instruction set for controlling operation of a steno translator system; and identifying the stroke symbols as either lexical stroke symbols or control stroke symbols and applying the control stroke symbols for controlling operation of the steno translator system.

32. The method of claim 31 further comprising the steps of using a stenographic keyboard to generate the series of stroke symbols and controlling the operation of a utlization means interconnected to the steno translator system in response to depression of the keys on the stenographic keyboard to generate control stroke symbols.

33. The method of claim 28 further comprising the step of selectively altering the composition of the list of the exception dictionary entries comprising the substeps of:

(a) generating a predefined first control stroke symbol, to enable alteration access to a memory in which the exception dictionary entries are stored, (b) entering a selected language part;

(c) generating a predefined second control stroke symbol to define the end of the entered language part;

(d) entering a plurality of lexical stroke symbols selectively defined to correspond to the entered language part;

(e) generating a predefined third control stroke symbol to define the end of the entered lexical stroke symbols; and (f) storing the entered language part and the corresponding entered lexical stroke symbols in the memory in association with each other.

34. The steno translator system of claim 25 wherein the step of comparing the left consonant part against the left consonant sublist occurs first, the step of comparing the vowel/right consonant part against the vowel/right consonant list occurs next, and the step of comparing the vowel against the vowel sublist occurs last and then only if there is no right consonant part of the lexical stroke symbol.

35. The method of claim 25 wherein the character set further comprises a flag symbol and at least a sublist of the vowels are defined as short vowels and wherein the step of combining the stroke symbol translation comprises:

associating a first flag with the stroke symbol translation of each lexical stroke symbol which includes a flag symbol character;

associating a second flag with the stroke symbol translation of each lexical stroke symbol having a left consonant part;

associating a third flag with the stroke symbol translation of each lexical stroke symbol having a vowel part which is a short vowel;

associating a fourth flag with the stroke symbol translation of each lexical stroke symbol having a vowel part and a right consonant part; and defining the stroke symbol translation as a suffix, prefix, or word in response to the associated settings of the first flag, second flag, third flag and fourth flag.

36. The method of claim 35 wherein the step of defining the stroke symbol translation as a suffix, prefix, or word comprises applying the following identifier rule set:

| Firstflag | | Secondflag | | Thirdflag | | Fourthflag | | I.D. |
|---|---|---|---|---|---|---|---|---|
| not | set | not | set | not | set | not | set | invalid |
| not | set | not | set | not | set |  | set | prefix |
| not | set | not | set |  | set | not | set | invalid |
| not | set | not | set |  | set |  | set | suffix |
| not | set |  | set | not | set | not | set | word |
| not | set |  | set | not | set |  | set | word |

-continued

| Firstflag | Secondflag | Thirdflag | Fourthflag | I.D. |
|---|---|---|---|---|
| not set | set | set | not set | prefix |
| not set | set | set | set | word |
| set | not set | not set | not set | invalid |
| set | not set | not set | set | prefix |
| set | not set | set | not set | invalid |
| set | not set | set | set | prefix |
| set | set | not set | not set | invalid |
| set | set | not set | set | prefix |
| set | set | set | not set | word |
| set | set | set | set | prefix |

37. The method of claim 35 or 36 wherein the character set further comprises a double symbol and the sublist of vowels further includes a sublist of vowel characters whose translation has a "Y" ending, and wherein the step of combining the stroke translation comprises:

doubling the last letter of the stroke symbol translation when the lexical stroke symbol includes a double symbol, and selectively altering the stroke symbol translation when the lexical stroke symbol includes a vowel from the sublist of "Y" ending vowels, the alteration occurring according to a predefined set of alteration rules.

38. The steno translation system of claim 4 further comprising:

means for defining each stroke symbol translation, derived from the scan chart memory as a suffix, prefix or word root by applying the predetermined identifier rule set to the lexical stroke symbol.

39. The steno translation system of claim 38 wherein the means for combining comprises:

means for combining a stroke symbol translation defined as a suffix with the stroke symbol translation of the immediately preceding stroke symbol translation in accordance with a first predefined language rule set; and means for combining each stroke symbol translation next succeeding a lexical stroke symbol in accordance with a second predefined language rule set.

* * * * *